United States Patent
Skye et al.

(10) Patent No.: US 12,326,567 B2
(45) Date of Patent: Jun. 10, 2025

(54) HINGED HEAD-MOUNTED DISPLAY DEVICE

(71) Applicant: Microsoft Technology Licensing, LLC, Redmond, WA (US)

(72) Inventors: Weston Taylor Skye, Mountain View, CA (US); Philip Andrew Frank, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 18/194,525

(22) Filed: Mar. 31, 2023

(65) Prior Publication Data

US 2024/0053614 A1 Feb. 15, 2024

Related U.S. Application Data

(60) Provisional application No. 63/371,000, filed on Aug. 10, 2022.

(51) Int. Cl.
*G02B 27/01* (2006.01)

(52) U.S. Cl.
CPC .. *G02B 27/0176* (2013.01); *G02B 2027/0154* (2013.01); *G02B 2027/0169* (2013.01)

(58) Field of Classification Search
CPC ........ G02B 27/0176; G02B 2027/0154; G02B 2027/0169
See application file for complete search history.

(56) References Cited

U.S. PATENT DOCUMENTS

| 4,660,943 A | 4/1987 | Ellis |
| 5,373,609 A * | 12/1994 | Ferrari ............... E05D 11/1021 |
| | | 16/370 |
| 5,752,280 A | 5/1998 | Hill |

(Continued)

FOREIGN PATENT DOCUMENTS

| EP | 1895865 B1 | 11/2008 |
| GB | 2564418 A | 1/2019 |

OTHER PUBLICATIONS

"International Search Report and Written Opinion Issued in PCT Application No. PCT/US23/027726", Mailed Date: Nov. 2, 2023, 13 Pages.

(Continued)

*Primary Examiner* — Pegeman Karimi
(74) *Attorney, Agent, or Firm* — Alleman Hall & Tuttle LLP

(57) ABSTRACT

A disclosed hinge assembly for a head-mounted display device comprises a four-bar linkage. A first linkage of the four-bar linkage is mountable to or forms part of a wearable article for a head of a user. A second linkage and a third linkage of the four-bar linkage each rotatably couple the first linkage to a fourth linkage of the four-bar linkage. The fourth linkage of the four-bar linkage is mountable to or forms part of a display device. A disclosed head-mounted display device comprises a display device; a rearward mount by which the head-mounted display device is mountable to a wearable article for a head of a user; and a hinge assembly rotatably coupling the display device to the rearward mount. The hinge assembly includes a four-bar linkage that provides a path of travel for the display device along a curved path from a deployed state to a stowed state.

20 Claims, 12 Drawing Sheets

(56) References Cited

U.S. PATENT DOCUMENTS

| | | | |
|---|---|---|---|
| 6,751,811 | B1 | 6/2004 | Hill |
| 8,286,270 | B2 | 10/2012 | Higgins |
| 9,848,665 | B2* | 12/2017 | Gendron .................. F41H 1/04 |
| 10,365,493 | B2 | 7/2019 | Pombo et al. |
| 11,366,324 | B2 | 6/2022 | Jenkins et al. |
| 2002/0120979 | A1 | 9/2002 | Prendergast |
| 2016/0054571 | A1 | 2/2016 | Tazbaz |
| 2019/0212772 | A1 | 7/2019 | Chen et al. |
| 2019/0227329 | A1 | 7/2019 | Han |
| 2020/0399942 | A1* | 12/2020 | Spoelstra .................. E05D 5/06 |
| 2022/0248797 | A1* | 8/2022 | Zeilinger ............... A42B 3/225 |
| 2024/0201505 | A1 | 6/2024 | Skye |

OTHER PUBLICATIONS

International Search Report and Written Opinion received for PCT Application No. PCT/US23/035937, Apr. 17, 2024, 21 pages.

Notification to pay additional search fee Received in PCT Application No. PCT/US23/035937, mailed on Feb. 26, 2024, 15 pages.

"Adjusting Angular Position of a Lever", Retrieved From: https://www.bing.com/videos/search?q=adjustment+mechanism+thang&&view=detail&mid=32289F2129BC03A150FF32289F2129BC03A150FF&&FORM=VRDGAR&ru=/videos/search?q%3Dadjustment%20mechanism%20thang%26qs%3Dn%26form%3DQBVR%26%3D%25eManage%20Your %20Search%20History%25E%26sp%3D-1%26pq%3Dadjustment%20mechanism%20thang%26sc%3D0-26%26sk%.

"Enhanced Combat Helmet (ECH) Training Video", Retrieved From: https://www.bing.com/videos/search?q=how+to+fit+army+helmet+ACH&docid=608049687254148794&mid=BDC4C40F8E5FD061E0ABBDC4C40F8E5FD061E0AB&view=detail&FORM=VIRE, Mar. 21, 2014, 2 Pages.

"Table Lifting Mechanism for Upright Drilling Machines 1", Retrieved From: https://www.youtube.com/watch? V=5QMYR2QcaD8, May 15, 2016, 4 Pages.

"Cabinet Door Hinges Vertical Swing Lift Up Stay Pneumatic Arm Kitchen Mechanism Hinges Durable Silent Silver", Retrieved From: https://www.amazon.com/Cabinet-Vertical-Pneumatic-Kitchen-Mechanism/dp/B095BVVKFM/ref=pd_lpo_3?pd_rd_i=B095BVVKFM&psc=1, Retrieved On: Jul. 26, 2022, 7 Pages.

\* cited by examiner

HINGED HEAD-MOUNTED DISPLAY DEVICE

CROSS REFERENCE TO RELATED APPLICATIONS

This application claims priority to U.S. Provisional Application Ser. No. 63/371,000, filed Aug. 10, 2022, the entirety of which is hereby incorporated herein by reference for all purposes.

BACKGROUND

Head-mounted display (HMD) devices may be used to present graphical content within the context of augmented reality (AR), virtual reality (VR), and mixed reality (MR) user experiences. HMD devices may be mounted to a wearable article such as a helmet, hat, visor, headband, or other head covering. Some HMD devices may be mounted to wearable articles via a hinge that enables a display device of the HMD device to be moved into and out of the line of sight of the user. HMD devices may feature adjustment mechanisms that enable adjustment of a positioning of the display device of the HMD device relative to the eyes of the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to an example, a disclosed hinge assembly for a head-mounted display device comprises a four-bar linkage. A first linkage of the four-bar linkage is mountable to or forms part of a wearable article for a head of a user. A second linkage and a third linkage of the four-bar linkage each rotatably couple the first linkage to a fourth linkage of the four-bar linkage. The fourth linkage of the four-bar linkage is mountable to or forms part of a display device.

According to another example, a disclosed head-mounted display device comprises: a display device; a rearward mount by which the head-mounted display device is mountable to a wearable article for a head of a user; and a hinge assembly rotatably coupling the display device to the rearward mount. The hinge assembly includes a four-bar linkage that provides a path of travel for the display device along a curved path between a deployed state and a stowed state.

According to another example, a disclosed head-mounted display device comprises: a wearable article for a head of a user; a display device; and a hinge assembly rotatably coupling the display device to the wearable article. The hinge assembly includes a four-bar linkage that provides a path of travel for the display device along a curved path between a deployed state and a stowed state. The display device in the stowed state is rearward of the deployed state and above the wearable article.

DETAILED DESCRIPTION

Figure 1:
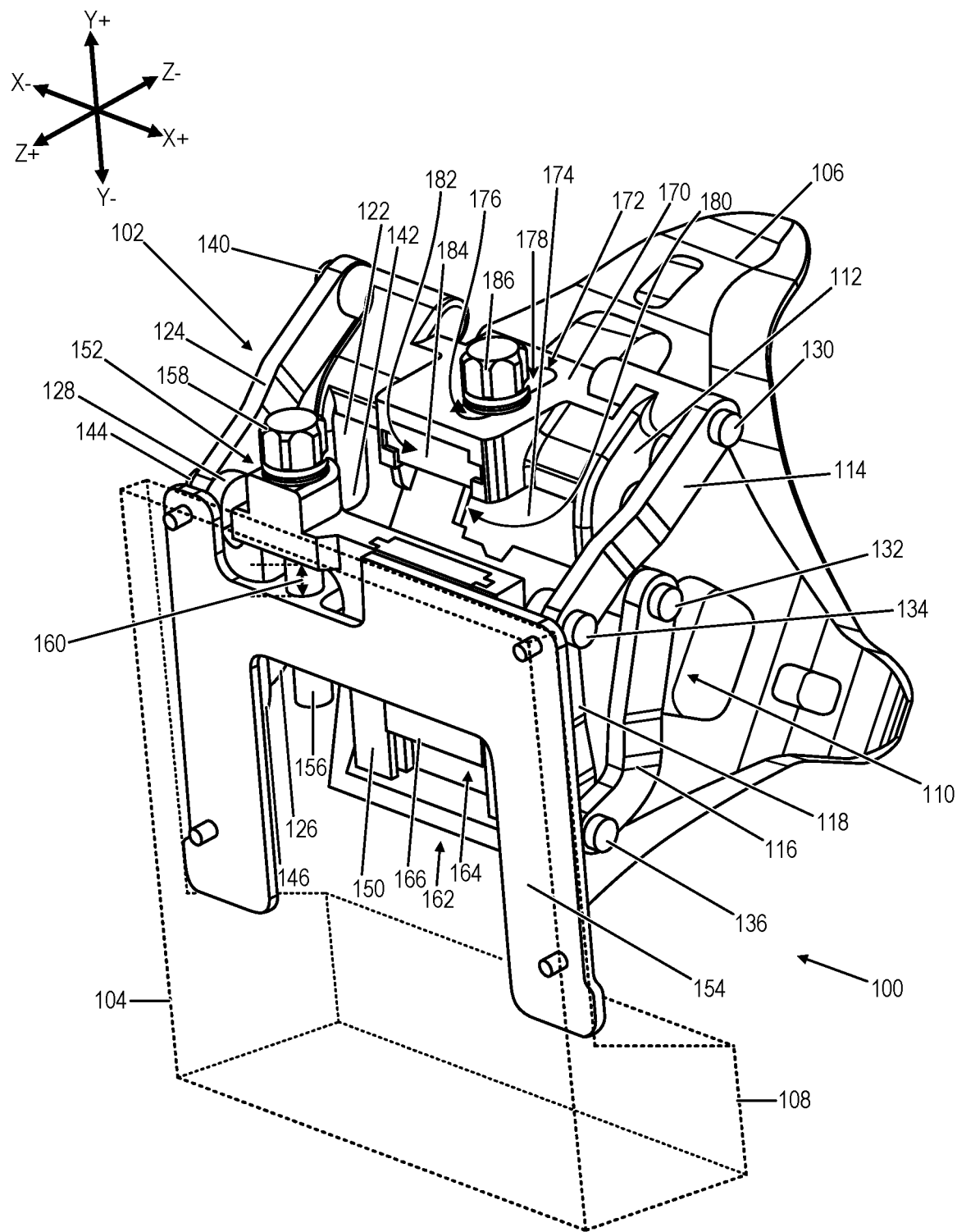
FIG. 1 depicts an HMD device that includes a hinge assembly that rotatably couples a forward component of the HMD device to a rearward component of the HMD device.

HMD devices may be used to present graphical content within the context of AR, VR, and MR user experiences. HMD devices may be mounted to a wearable article such as a helmet, hat, visor, headband, or other head covering. Some HMD devices may be mounted to wearable articles via a hinge that enables a display device of the HMD device to be moved into and out of the line of sight of the user. HMD devices may feature adjustment mechanisms that enable adjustment of a positioning of the display device of the HMD device relative to the eyes of the user.

A potential disadvantage of HMD devices that feature a hinge is that the display device extends outward and away from the head of the user. As an example, some HMD devices feature a hinge that enables rotation of the display device forward and outward to a horizontal position above and forward of the eyes of the user. In this configuration, mass of the display device also extends forward and outward from the head of the user. As a center of mass of the display device moves further away from the head of the user, particularly in a horizontal dimension orthogonal to the gravity vector, forces experience by the user (e.g., torque at the neck of the user) may be increased due to mechanical advantage. These added forces may be more pronounced from the perspective of the user in scenarios where the head of the user is experiencing acceleration, such as during walking, running, movement of the head, vehicle transport, etc. Furthermore, changes in inertial response caused by repositioning of the display device of the HMD device may impede natural movement and control of head motion by the user, particularly where the center of mass of the display device extends outward in a horizontal dimension orthogonal to the gravity vector.

A hinge assembly of an HMD device is disclosed that enables a display device of the HMD device to be moved into and out of the line of sight of the user by rotating between a deployed state in which the display device is positioned within the line of sight of the user, and a stowed state in which the display device is positioned at or near an upper portion of the head of the user. By positioning the display device of the HMD device at or near the upper portion of the head of the user, forces and changes in inertial response experienced by the user in the stowed state may be reduced. Additionally, by positioning the display device further rearward and above the head of the user, impact events may be reduced between the display device or other forward components, and foreign objects within the vicinity of the brow line of the user.

In at least some examples, the disclosed hinge assembly includes a four-bar linkage that defines a path of travel of the display device between the deployed state and the stowed state. As an example, the four-bar linkage couples the display device to a wearable article such as a helmet, hat, visor, headband, or other suitable head covering. In at least some examples, the four-bar linkage is one of two or more four bar linkages of the disclosed hinge assembly that operate in parallel to each other to support and define the path of travel of the display device.

In at least some examples, the path of travel of the display device between the deployed state and the stowed state accommodates use of a brimmed helmet, brimmed hat, brimmed visor, brimmed headband, or other brimmed head covering. As an example, to move from the deployed state to the stowed state, a display plane of the display device by which light is emitted toward the eyes of the user is translated outward from the face of the user along the path of travel to clear a region that may be occupied by a brim of a wearable article before rotating upward and rearward to the stowed state at or near the upper portion of the head of the user. The path of travel may be reversed to move the display device from the stowed state to the deployed state.

Furthermore, in at least some examples, the path of travel of the display device between the deployed state and the stowed state supports the concept of light security by continuing to face the display plane of the display device toward the head of the user throughout the path of travel and while positioned in the stowed state. Light security, in this context, refers to the reduction or minimization of light being emitted outward or away from the user. The path of travel may be reversed to move the display device from the stowed state to the deployed state while continuing to face the display plane of the display device toward the head of the user throughout the path of travel.

In at least some examples, the disclosed hinge assembly includes one or more adjustment mechanisms that enable a positioning of the display device in at least the deployed state to be adjusted relative to a rear mount that is mountable to or integrated with a wearable article such as a helmet, hat, visor, headband, or other head covering. Adjustment to a positioning of the display device can include translation in one, two, or more dimensions, and rotation in at least one plane.

As an example, one or more adjustment mechanisms of the disclosed hinge assembly enable the display device to be adjusted in one or more degrees of freedom, including translation and rotation in a variety of dimensions. As the positioning of the display device is adjusted relative to the rearward mount, the positioning of the display device relative to the eyes of the user may be similarly adjusted to accommodate a range of human body configurations and user fit configurations.

In at least some examples, rotational adjustment may be used to provide two or more viewing angles of the display device that are suitable for two or more viewing modes in the deployed state. In an upright viewing mode of the deployed state, suitable for a seated or standing body position, the display device has a first viewing angle or range of viewing angles. In a prone viewing mode of the deployed state, suitable for a prone body position of the user in which the neck and head are tilted rearward relative to the body, the display device has a second viewing angle or range of viewing angles. As an example, in the prone viewing mode, the display plane of the display device may be angled rearward (e.g., 8 degrees or other suitable angle) relative to the upright viewing mode.

FIG. 1 depicts an HMD device 100 that includes a hinge assembly 102 that rotatably couples a forward component 104 of the HMD device to a rearward component 106 of the HMD device. Hinge assembly 102 of FIG. 1 is one example of the disclosed hinge assembly in the deployed state and upright viewing mode.

Forward component 104, as an example, takes the form of an electronic device that includes a display device 108, such as a near-eye graphical display by which graphical content can be presented. Forward component 104 may include additional components, including cameras, sensors, user input interfaces, audio output devices, batteries, computing devices, electronic circuitry, etc. Forward component 104 is represented schematically in wireframe in FIG. 1 to illustrate features of hinge assembly 102. Accordingly, it will be understood that forward component 104 may take other suitable forms.

Rearward component 106 may be integrated with, mounted to, or mountable to a wearable article that can be worn upon a head of a user. Examples of wearable articles include a helmet, hat, visor, headband, or other head covering. Rearward component 106, as an example, may take the form of a shroud that can be mounted to a helmet, as depicted schematically in FIGS. 2, 3, and 4.

Hinge assembly 102 includes a first four-bar linkage 110. In this example, first four-bar linkage 110 is located on a left-hand side of hinge assembly 102 from a perspective of a user wearing HMD device 100. Hinge assembly 100 further includes a second four-bar linkage 120 located on a right-hand side of the hinge assembly from a perspective of the user wearing HMD device 100. While hinge assembly 102 includes two four-bar linkages that are operable in parallel with each other, it will be understood that a single four-bar linkage may be used to provide the same or similar path of travel with respect to forward component 104. In this configuration, the four-bar linkage may be centrally positioned about a midplane (e.g., a Y-Z plane) of HMD device 100.

First four bar linkage 110 includes a first linkage 112, a second linkage 114, a third linkage 116, and a fourth linkage 118. In this example, first linkage 112 forms a ground linkage of first four-bar linkage 110; second linkage 114 and third linkage 116 each form a rocker linkage of first four-bar linkage 110; and fourth linkage 118 forms a coupler linkage of first four-bar linkage 110. First linkage 112 is rotatably coupled to second linkage 114 via a joint 130, and first linkage 112 is rotatably coupled to third linkage 116 via a joint 132 that is spaced apart from joint 130 to define an effective length dimension of first linkage 112. Fourth linkage 118 is rotatably coupled to second linkage 114 via a joint 134 that is spaced apart from joint 130 to define an effective length dimension of the second linkage, and fourth linkage 118 is rotatably coupled to third linkage 116 via a joint 136 that is spaced apart from joint 132 to define an effective length dimension of third linkage 116. Joint 134 is spaced apart from joint 136 to define an effective length dimension of fourth linkage 118.

Second four bar linkage 120 includes a first linkage 122, a second linkage 124, a third linkage 126, and a fourth linkage 128. In this example, first linkage 122 forms a ground linkage of second four-bar linkage 120; second linkage 124 and third linkage 126 each form a rocker linkage of second four-bar linkage 120; and fourth linkage 128 forms a coupler linkage of second four-bar linkage 120. First linkage 122 is rotatably coupled to second linkage 124 via a joint 140, and first linkage 122 is rotatably coupled to third linkage 126 via a joint 142 that is spaced apart from joint 140 to define an effective length dimension of first linkage 122. Fourth linkage 128 is rotatably coupled to second linkage 124 via a joint 144 that is spaced apart from joint 140 to define an effective length dimension of second linkage 124, and fourth linkage 128 is rotatably coupled to third linkage 126 via a joint 146 that is spaced apart from joint 142 to define an effective length dimension of third linkage 126. Joint 144 is spaced apparat from joint 146 to define an effective length dimension of fourth linkage 128.

In this example, fourth linkage 118 of first four-bar linkage 110 and fourth linkage 128 of second four-bar linkage 120 are integrated together to form a coupler bracket 150. As another example, fourth linkage 118 of first four-bar linkage 110 and fourth linkage 128 of second four-bar linkage 120 may alternatively form separate or separable components. In this separate or separable configuration, fourth linkage 118 of first four-bar linkage 110 and fourth linkage 128 of second four-bar linkage 120 may be mounted to or integrated with a shared component, such as a separate coupler bracket or forward component 104, as examples.

Forward component 104 may be mounted to fourth linkage 118 of first four-bar linkage 110 and to fourth linkage 128 of second four-bar linkage 120, either directly or indirectly via one or more intermediate components. In this example, forward component 104 is mounted to fourth linkage 118 of first four-bar linkage 110 and to fourth linkage 128 of second four-bar linkage 120 via an adjustment mechanism 152. Adjustment mechanism 152, in this example, includes coupler bracket 150 and a forward mount 154 to which forward component 104 is mounted.

Adjustment mechanism 152 is operable to adjust a positioning of forward mount 154 relative to coupler bracket 150, thereby enabling a positioning of forward component 104 to be adjusted relative to fourth linkage 118 of first four-bar linkage 110 and fourth linkage 128 of second four-bar linkage 120. In this example, adjustment mechanism 152 enables adjustment in the Y-axis dimension by translation of forward mount 154 and forward component 104 mounted thereto relative to coupler bracket 150.

Adjustment in the Y-axis dimension by translation is provided, in this example, by adjustment mechanism 152 including a threaded shaft 156 (e.g., a bolt or screw) that is rotatable by a user via an adjustment interface element 158 (e.g., a knob, lever, tool, etc.) to change a standoff distance 160 in the Y-axis dimension between coupler bracket 150 and forward mount 154. Forward mount 154, for example, defines a threaded receptacle that accommodates corresponding threads of threaded shaft 156. Threaded shaft 156 may be retained at a fixed position in the Y-axis dimension within a receptacle of coupler bracket 150 via a retaining clip, annular ring, or other suitable structure. It will be understood that other suitable adjustment mechanisms may be used, as described in further detail herein.

Furthermore, in this example, adjustment mechanism 152 features a track system 162 orientated along the Y-axis dimension that is formed by coupler bracket 150 and forward mount 154 to constrain movement of the forward mount relative to the coupler bracket to translation along the Y-axis dimension. In this example, track system 162 is formed by a channel 164 defined by coupler bracket 150 and a corresponding rail 166 defined by forward mount 164 that rides within the channel. In another example, track system 162 may be formed by a channel defined by forward mount 164 and a corresponding rail defined by coupler bracket 150 that rides within the channel.

First linkage 112 of first four-bar linkage 110 and first linkage 122 of second four-bar linkage 120, in this example, are integrated together to form a ground bracket 170. In another example, first linkage 112 of first four-bar linkage 110 and first linkage 122 of second four-bar linkage 120 may alternatively form separate or separable components. In this separate or separable configuration, first linkage 112 of first four-bar linkage 110 and first linkage 122 of second four-bar linkage 120 may be mounted to or integrated with a shared component, such as a separate ground bracket, rearward component 106, or a wearable article, as examples.

First linkage 112 of first four-bar linkage 110 and first linkage 122 of second four-bar linkage 120 may be mounted to rearward component 106 either directly or indirectly via one or more intermediate components. In this example, first linkage 112 of first four-bar linkage 110 and first linkage 122 of second four-bar linkage 120 are mounted to rearward component 106 via an adjustment mechanism 172. Adjustment mechanism 172 includes ground bracket 170 and rearward mount 174 that is mounted or mountable to rearward component 106.

As an example, a rear side of rearward mount 174 may define a first portion of a latch and rearward component 106 may define a second portion of the latch, enabling the rearward mount to be selectively mounted to or removed from rearward component 106. This configuration enables HMD device 100 to be selectively removed from or mounted to a wearable article, such as a helmet, hat, visor, headband, or other suitable head covering.

Adjustment mechanism 172 is operable to adjust a positioning of ground bracket 174 and hence first four-bar linkage 110 and second four-bar linkage 120 relative to rearward mount 174 and hence rearward component 106. In this example, adjustment mechanism 172 enables adjustment of ground bracket 170 by translation in the Z-axis dimension (e.g., depth dimension relative to the user) relative to rearward mount 174.

Adjustment by translation in the Z-axis dimension is provided, in this example, by adjustment mechanism 172 including a follower 176 (e.g., a shaft) that is translatable within a slot 178 defined by ground bracket 170. Movement of ground bracket 170 is constrained to the Z-axis dimension, in this example, by a track system 180. In this example, track system 180 is formed by a channel 182 defined by ground bracket 170 and a corresponding rail 184 defined by rearward mount 174 that rides within the channel. A position of follower 176 along slot 178 can be maintained by tightening a head 186 of follower 176 against a surface (e.g., via one or more intermediate washers) of ground bracket 170.

In the example depicted in FIG. 1, follower 176 takes the form of a threaded shaft (e.g., a bolt or screw). The position of follower 176 along slot 178 can be varied by loosening head 186 of the threaded shaft to permit ground bracket 170 to be translated in the Z-axis dimension. The threaded shaft of follower 176, in this example, engages with corresponding threads of a threaded receptacle (not shown) defined by rearward mount 174.

In another example, track system 180 may be formed by a channel defined by rearward mount 174 and a corresponding rail defined by ground bracket 170 that rides within the channel. Furthermore, in at least some examples, rearward mount 174 instead defines a slot and the threaded shaft of adjustment mechanism 172 engages with corresponding threads provided by a threaded receptacle defined by ground bracket 170. It will be understood that other suitable adjustment mechanisms may be used, as described in further detail herein.

In the configuration of FIG. 1, adjustment mechanism 172 for adjustment in the Z-axis dimension is located rearward of first four-bar linkage 110 and second four-bar linkage 120, and adjustment mechanism 152 for adjustment in the Y-axis dimension is located forward of first four-bar linkage 110 and second four-bar linkage 120. In another example, an adjustment mechanism for adjustment in the Z-axis dimension may be located forward of first four-bar linkage 110 and second four-bar linkage 120, and an adjustment mechanism for adjustment in the Y-axis dimension may be located rearward of first four-bar linkage 110 and second four-bar linkage 120. As yet other examples, adjustment mechanisms for adjustment in the Z-axis dimension and the Y-axis dimension may be each located forward of first four-bar linkage 110 and second four-bar linkage 120, or may be each located rearward of the first four-bar linkage and the second four-bar linkage.

Figure 2:
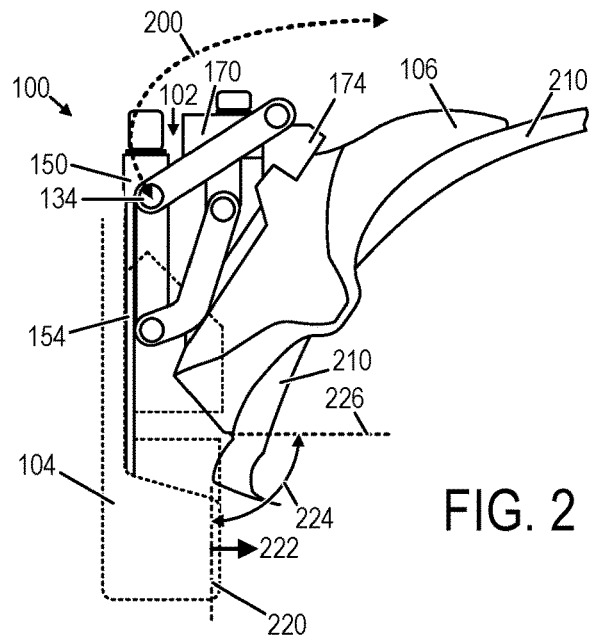
FIG. 2 depicts the HMD device of FIG. 1 in a deployed state and an upright viewing mode.
Figure 3:
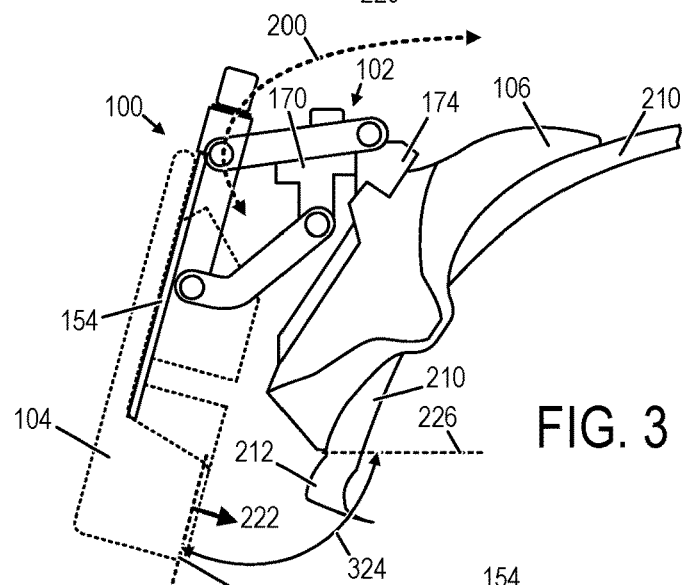
FIG. 3 depicts the HMD device of FIG. 1 rotated along a path of travel between the deployed state of FIG. 2 and a stowed state of FIG. 4.
Figure 4:
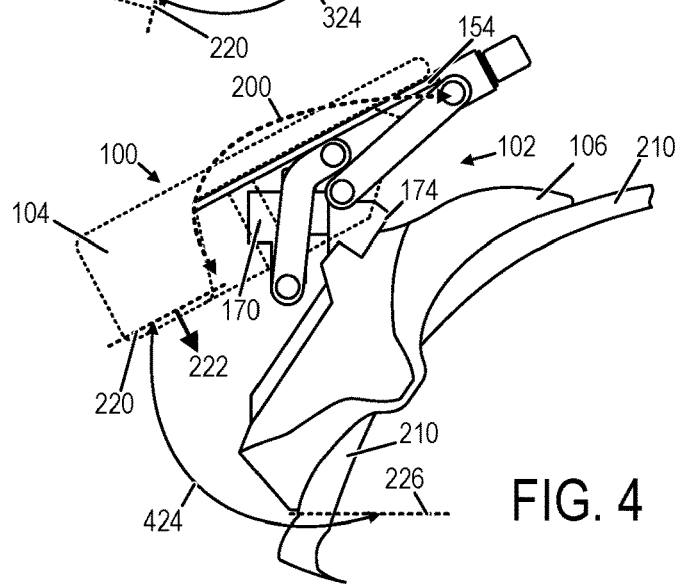
FIG. 4 depicts the HMD device of FIG. 1 in the stowed state.

FIGS. 2, 3, and 4 depict a side view of HMD device 100 of FIG. 1, as may be viewed along the X-axis of FIG. 1, at different positions along a path of travel 200 between the deployed state shown in FIG. 2 and the stowed state shown in FIG. 4. Path of travel 200 is depicted in FIGS. 2, 3, and 4 with respect to joint 134, as an example reference point of HMD device 100.

Within FIGS. 2, 3, and 4 rearward component 106 is mounted to a helmet 210, as an example of a wearable article, a partial outline of which is represented schematically for purposes of illustration. A display plane 220 of display device 108 of forward component 104 is represented schematically in FIGS. 2, 3, and 4, along with an example display vector 222 to illustrate a general direction of light emitted by the display device. As an example, within the deployed state of FIG. 2, display vector 222 is generally directed at a location of the eyes of a user wearing helmet 210.

Referring to FIG. 2, HMD device 100 is positioned in the deployed state, and the upright viewing mode. In the deployed state and the upright viewing mode of FIG. 2, display plane 220 is represented schematically in FIG. 2 as having a first angle 224 relative to a reference frame 226 of rearward component 106 (e.g., the X-Z plane of FIG. 1).

Referring to FIG. 3, forward component 104 of HMD device 100 is rotated away from the deployed state of FIG. 2 and toward the stowed state of FIG. 4 along path of travel 200 via hinge assembly 102. In this example, display plane 220 is moved outward from helmet 210 in FIG. 3 as compared to FIG. 2, enabling forward component 104 and the display device thereof to clear a brim 212 of helmet 210 as the forward component is rotated away from the deployed state toward the stowed state.

In FIG. 3, a second angle 324 between display plane 220 and reference frame 226 of rearward component 106 is depicted as being greater than first angle 224 of FIG. 2, representing rotation of the display plane. Even with such rotation of display plane 220, display vector 222 remains directed generally toward the user, thereby maintaining light security with respect to light emitted by the display device.

Referring to FIG. 4, forward component 104 of HMD device is rotated upward and rearward from the position of FIG. 3 to the stowed state along path of travel 200. In the stowed state of FIG. 4, forward component 104 is positioned above and along an upper portion of helmet 210. The stowed state of FIG. 4 locates the center of mass of forward component 104 above the head of the user wearing helmet 210, thereby reducing forces (e.g., torque) on the user that may otherwise result if the center of mass of the forward component were cantilevered further outward and forward of the helmet.

In FIG. 3, a third angle 424 between display plane 220 and reference frame 226 of rearward component 106 is depicted as being greater than second angle 324 of FIG. 3, representing further rotation of the display plane. Even with such rotation of display plane 220, display vector 222 remains directed generally toward the user and helmet, thereby maintaining light security with respect to light emitted by the display device.

In at least some examples, an adjustment mechanism may be included with the HMD device to enable rotational adjustment of forward portion 104 to provide two or more viewing angles of the display device that are suitable for two or more viewing modes in the deployed state. An example of previously described HMD device 100 of FIG. 1 is depicted in FIG. 5 as HMD device 100-5 that further includes an adjustment mechanism 510 that is operable to provide rotational adjustment of forward portion 104 relative to rearward portion 106.

Figure 5:
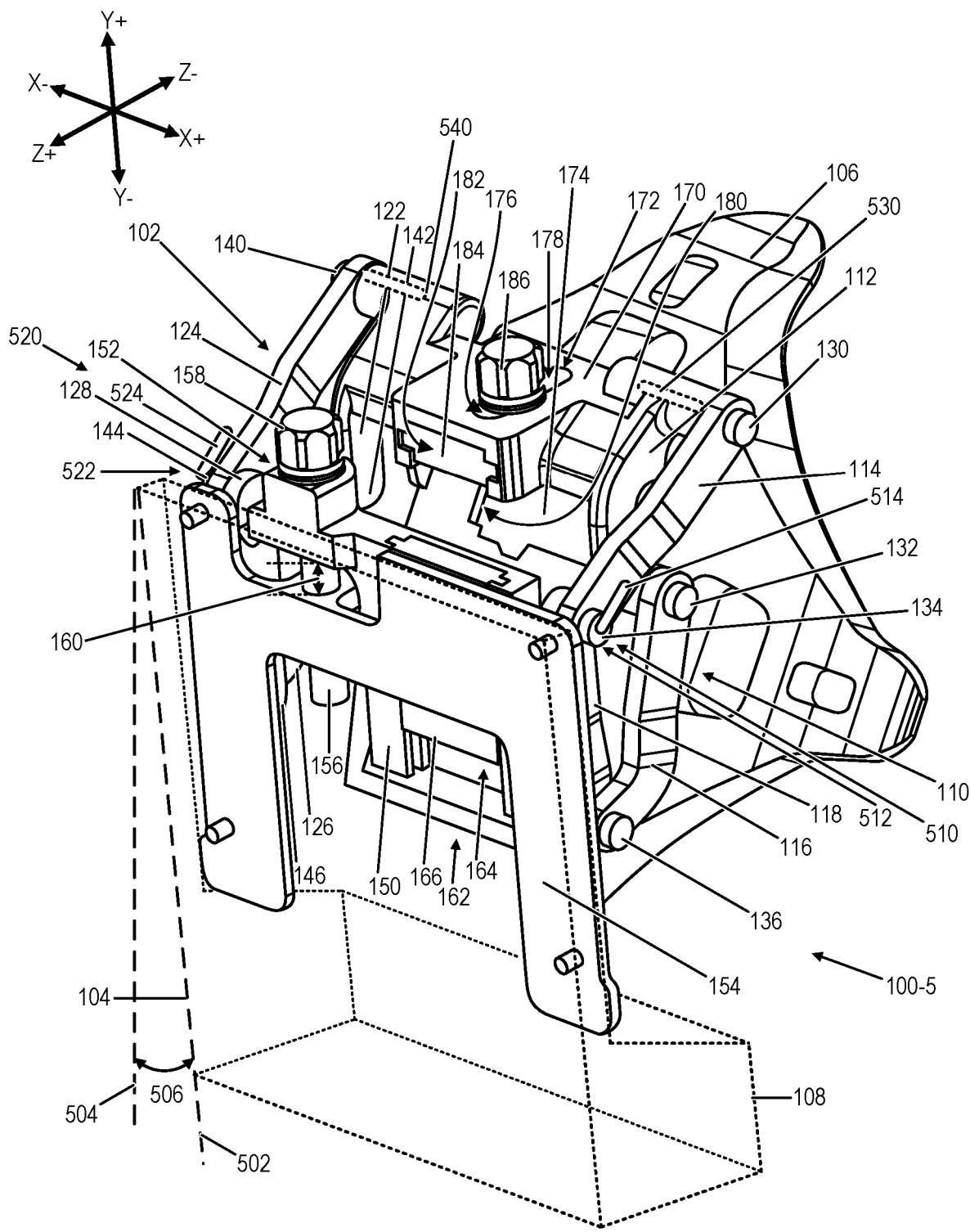
FIG. 5 depicts the HMD device of FIG. 1 in the upright viewing mode and a prone viewing mode, with additional components.

As previously described, in the upright viewing mode of the deployed state shown in FIGS. 1 and 5, suitable for a seated or standing body position, display device 108 has a first viewing angle 502 or range of viewing angles. In the prone viewing mode of the deployed state, suitable for a prone body position of the user in which the neck and head are tilted rearward relative to the body, the display device has a second viewing angle 504 or range of viewing angles. As an example, in the prone viewing mode corresponding to second viewing angle 504, an upper edge of the display plane of the display device may be angled rearward relative to a lower edge of the display plane by an amount that is greater than the first viewing angle 502 of the upright viewing mode. As one example, a viewing angle adjustment 506 between first viewing angle 502 and second viewing angle 504 is 8 degrees. As another example, the viewing angle adjustment 506 between first viewing angle 502 and second viewing angle 504 is within a range of 6-10 degrees. However, it will be understood that other suitable viewing angle adjustments may be used or otherwise supported by an adjustment mechanism.

Adjustment mechanism 510, in this example, includes an eccentric rotational bracket 512 that is integrated with joint 134 of first four-bar linkage 110. An example of eccentric rotational bracket 512 is described in further detail with reference to FIGS. 6-9. Adjustment mechanism 510 further includes a viewing angle selector element 514 that enables a user to select between at least first viewing angle 502 and second viewing angle 504 by manipulation of eccentric rotational bracket 512. In this example, viewing angle selector element 514 takes the form of a lever. However, viewing angle selector element 514 may take other suitable forms. As another example, viewing angle selector element 514 takes the form of a knob.

In at least some examples, adjustment of the viewing angle between at least first viewing angle 502 of the upright viewing mode and second viewing angle 504 of the prone viewing mode may be enabled by an additional adjustment mechanism 520 that is associated with second four-bar linkage 120. Adjustment mechanism 520, in this example, includes another eccentric rotational bracket 522 that is integrated with joint 144 of second four-bar linkage 120. An example of eccentric rotational bracket 522 is described in further detail with reference to FIGS. 6-10. Adjustment mechanism 520 further includes a viewing angle selector element 524 that enables a user to select between at least first viewing angle 502 and second viewing angle 504 by manipulation of eccentric rotational bracket 522. In this example, similar to eccentric rotational bracket 512, viewing angle selector element 524 takes the form of a lever. However, viewing angle selector element 524 may take other suitable forms. As another example, viewing angle selector element 524 takes the form of a knob.

While eccentric rotational brackets 512 and 522 are described as being integrated with joints 134 and 144, in other examples, eccentric rotational brackets may be integrated with other joints of the first four-bar linkage 110 and the second four-bar linkage 120. Furthermore, it will be understood that other suitable adjustment mechanisms can be used to enable adjustment of the viewing angle.

In at least some examples, the disclosed hinge assembly includes one or more detent mechanisms and/or one or more friction mechanisms at joints of the hinge assembly that assist in maintaining a current state or positioning of the hinge assembly during user activities that include walking, running, movement of the head, etc.

FIG. 5 schematically depicts joint 130 of first four-bar linkage 110 and joint 140 of second four-bar linkage 110 including an integrated mechanism 530 and 540, respectively. Integrated mechanisms 530 and 540 may take the form of a detent mechanism and/or a friction mechanism. While integrated mechanisms 530 and 540 are described as being incorporated into joints 130 and 140, respectively, it will be understood that some or all joints of hinge assembly 102 can include an integrated mechanism, such as a detent mechanism and/or a friction mechanism. For example, a first joint (e.g., 130) of first four-bar linkage 110 can include a detent mechanism, a second joint (e.g., 132) of first four-bar linkage 110 can include a friction mechanism, a first joint (e.g., 140) of second four-bar linkage 120 can include a detent mechanism, and a second joint (e.g., 142) of second four-bar linkage 120 can include a friction mechanism.

A detent mechanism of hinge assembly 102, if engaged in the deployed state of HMD device 100, can maintain forward component 104, including display device 108 in the deployed state until disengaged. Additionally or alternatively, the detent mechanism, if engaged in the stowed state of HMD device 100, can maintain forward component 104, including display device 108 in the stowed state until disengaged. An example of a detent mechanism that can be integrated with a joint of hinge assembly 102 is described in further detail with reference to FIG. 13.

Friction mechanisms may be tuned or otherwise selected to provide a particular level of friction at a particular joint of hinge assembly 102, thereby defining a suitable level of torque needed to overcome the friction introduced by the friction mechanism(s) when adjusting a positioning of forward component 104 relative to rearward component 106 via hinge assembly 10s2. As an example, a suitable level of torque may be defined so that forward component 104, including display device 108 does not rotate via hinge assembly 102 relative to rearward component 106 under its own weight. As another example, a suitable level of torque may be defined so that forward component 104, including display device 108 does not rotate via hinge assembly 102 relative to rearward component 106 under specified dynamic loading scenarios such as head movement (e.g., nodding), walking, running, jumping, etc. Examples of friction mechanisms that can be integrated into a joint of hinge assembly 102 are described in further detail with reference to FIGS. 11 and 12.

Figure 6:
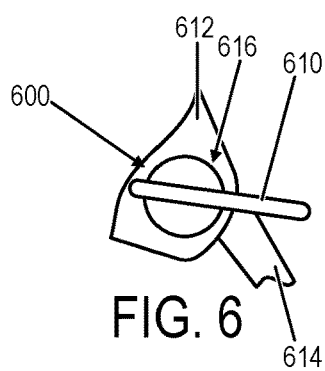
FIGS. 6-10 depict an example eccentric rotational bracket.
Figure 7:
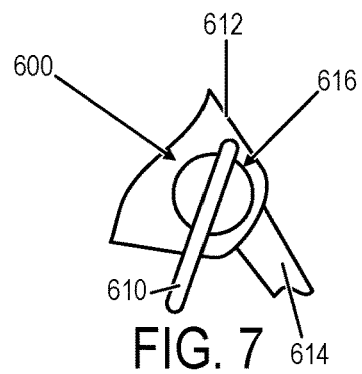

FIGS. 6-10 depict an example of an eccentric rotational bracket 600 having a viewing angle selector element 610 that can be used for eccentric rotational brackets 512 and 522 of FIG. 5. FIGS. 6 and 7 show eccentric rotational bracket 600 integrated with a joint 616 between a first linkage 612 and a second linkage 614. In FIG. 6, eccentric rotational bracket 600 and viewing angle selector element 610 have a first angular position that defines a first axis of rotation of joint 616. In FIG. 7, eccentric rotational bracket 600 and viewing angle selector element 610 are rotated to a second angular position relative to the first angular position of FIG. 6, which moves the axis of rotation of joint 616 relative to a second axis of rotation that is parallel to and displaced from the first axis of rotation.

Figure 8:
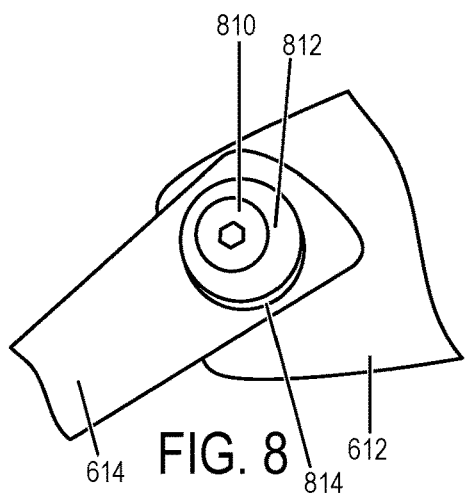

FIG. 8 shows a rear view of eccentric rotational bracket 600 showing a threaded fastener 810 (e.g., a bolt or screw) and a pair of washers 812 and 814 of the eccentric rotational bracket.

Figure 9:
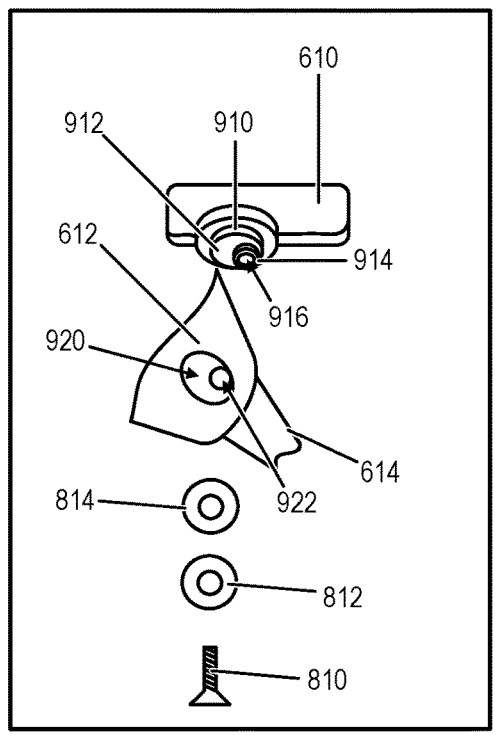
Figure 10:
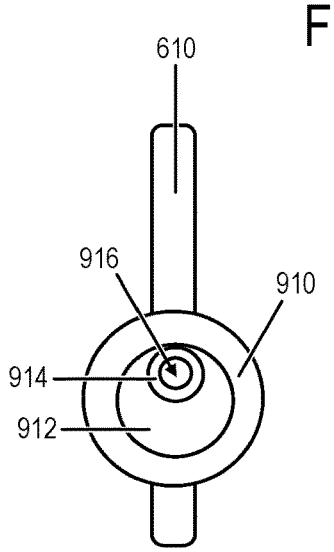

FIGS. 9 and 10 show disassembled views of eccentric rotational bracket 600, including a first circular bearing portion 910 that has a circular bearing face 912, and a second circular bearing portion 914 that is located off-center from a center point of circular bearing face 912. Second circular bearing portion 914 defines a threaded receptacle that accommodates threaded fastener 810. First circular bearing portion 910 fits within a first opening 920 formed in linkage 612, and second circular bearing portion 914 fits within a second opening 922 formed in linkage 614 that has a smaller diameter than first opening 920. In this configuration, second opening 922 is off-center from a center point of first opening 920. Threaded fastener 810 passes through washers 812, 814, and opening 922 and engages with threaded receptacle 916 to secure bracket 600 to linkages 612 and 614.

Figure 11:
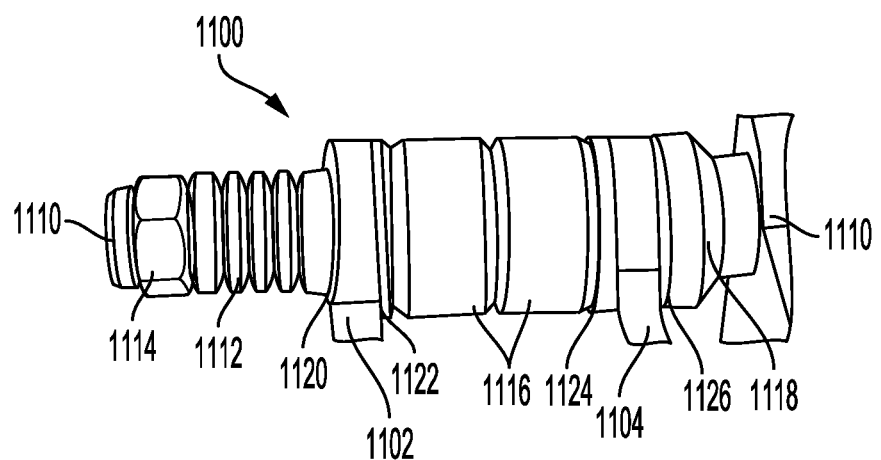
FIG. 11 depicts an example friction mechanism.

FIG. 11 depicts an example friction mechanism 1100 that can be integrated with a joint of hinge assembly 102. Friction mechanism 1100 includes a shaft 1110 upon which a first linkage 1102 and a second linkage 1104 are mounted. A spring element 1112 is mounted on shaft 1110 that applies a compressive force onto first linkage 1102 and second linkage 1104. In this example, spring element 1112 is mounted on shaft 1110 between a first retaining element 1114 and first linkage 1102, a spacer 1116 is mounted on shaft 1110 between first linkage 1102 and second linkage 1104, and second linkage 1104 is mounted on shaft 1110 between space 1116 and a second retaining element 1118.

The compressive force applied to first linkage 1102 by spring 1112 generates friction to rotation of the first linkage about shaft 1110 at friction interfaces 1120 and 1122. The compressive force applied to second linkage 1104 by spring 1112 generates friction to rotation of the second linkage about shaft 1110 at friction interfaces 1124 and 1126. In at least some examples, the compressive force applied by spring 1112 may be adjusted by adjusting a position (e.g., a distance) of first retaining element 1114 relative to second retaining element 1118 along shaft 1110. As an example, first retaining element 1114 may take the form of a threaded nut and shaft 1110 may have corresponding threads that enables first retaining element 1114 to be moved back and forth along an axis of shaft 1110 by rotation of the threaded nut relative to the shaft.

Figure 12:
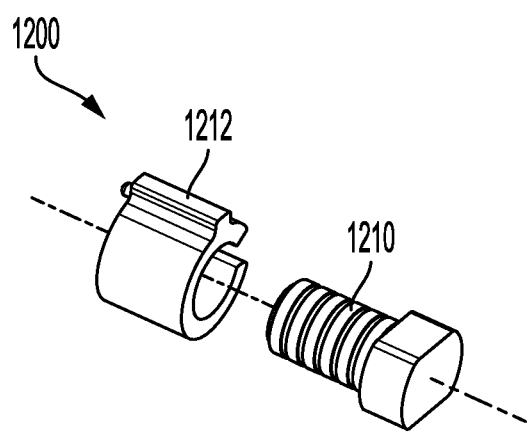
FIG. 12 depicts another example friction mechanism.

FIG. 12 depicts another example friction mechanism 1200 that can be integrated with a joint of hinge assembly 102. As an example, a first linkage can be rotatably coupled to a second linkage via a friction shaft 1210 of friction mechanism 1200. Friction mechanism 1200 further includes a clip 1212 through which friction shaft 1210 passes. Clip 1212 exerts a circumferential force upon friction shaft 1210. Rotation of friction shaft 1210 relative to clip 1212 generates friction at a friction interface between the friction shaft and interior surfaces of clip 1212 that interface with the friction shaft. Friction mechanism 1200 may be integrated with a joint by which two linkages are rotatably coupled by fixing friction shaft 1210 to a first linkage, and by fixing clip 1212 to a second linkage.

Figure 13:
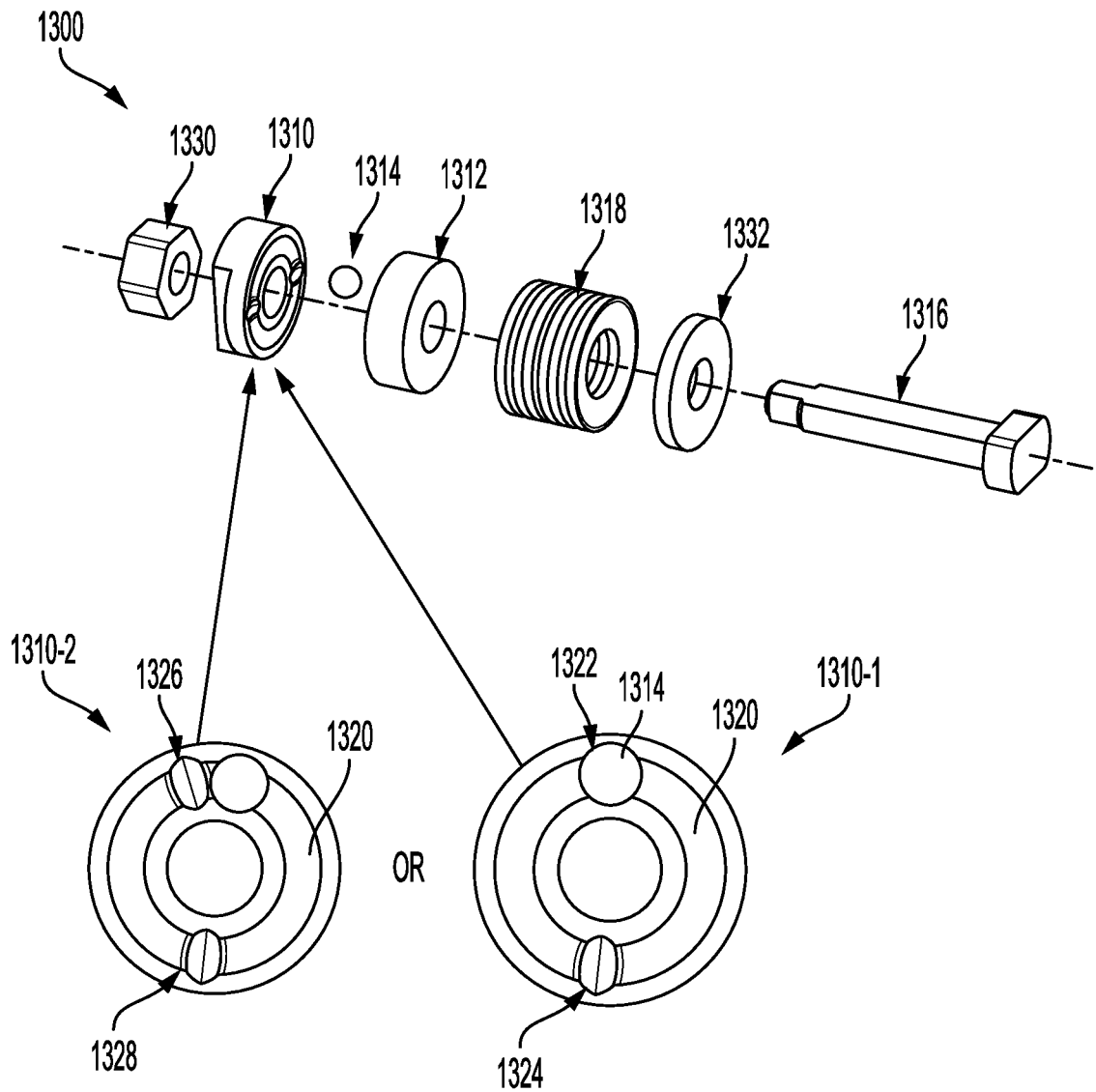
FIG. 13 depicts an example detent mechanism.

FIG. 13 depicts an example detent mechanism 1300 that can be integrated with a joint of hinge assembly 102. Detent mechanism 1300 includes a first cam 1310 and a second cam 1312 that can rotate relative to each other on opposing sides of a ball 1314. Second cam 1312 includes a receptacle that accommodates a portion of ball 1314. Ball 1314 remains within the receptacle of second cam 1312 throughout engaged and disengaged states of detent mechanism 1300.

First cam 1310 and second cam 1312 are mounted on a pin or shaft 1316 with a disc spring 1318. First cam 1310, second cam 1312, and disc spring 1318 may be retained on shaft 1316 by a nut 1330 and washer 1332. For example, pin or shaft 1316 can include threads that engage with corresponding threads of nut 1330. Disc spring 1318 applies a compressive force to first cam 1310 and second cam 1312 that compresses first cam 1310 and second cam 1312 onto ball 1314.

Within the context of a joint by which two linkages are rotatably coupled, such as within hinge assembly 102, first cam 1310 is fixed to or forms part of a first linkage, and second cam 1312 is fixed to or forms part of a second linkage.

First cam 1310 can take various forms, examples of which are depicted in FIG. 13 as 1310-1 and 1310-2. As an example, cam 1310-1 can be used in an instance of detent mechanism 1300 at a joint (e.g., 130) of first four-bar linkage 110, and cam 1310-2 can be used in another instance of detent mechanism 1300 at a joint (e.g., 140) of second four-bar linkage 120.

First cam 1310 defines a circular track 1320 along which ball 1314 can travel. First cam 1310 further defines one or more receptacles along circular track 1320 that accommodate a portion of ball 1314 that projects outward from second cam 1312. As ball 1314 resides within a receptacle of second cam 1312, when ball 1314 also resides within a receptacle of first cam 1310, rotation of the first cam relative to the second cam about pin 1316 is inhibited, thereby providing an engaged detent function. When the compressive force provided by disc spring 1318 is overcome (e.g., by a user pulling a head of pin or shaft 1316 away from nut 1330), first cam 1310 can be rotated relative to second cam 1312, and ball 1314 is released from the receptacle of the first cam into circular track 1320, thereby disengaging the detent function.

Referring to first cam 1310-1, as an example, a first receptacle 1322 is located at a different angular position along circular track 1320 as second receptacle 1320. For example, first receptacle 1322 may be located at 0 degrees in a radial reference frame of circular track 1320, and second receptacle 1324 may be located at 190 degrees (or other suitable angle) measured in the clockwise direction in FIG. 13. In this example, first receptacle 1322 corresponds to the deployed state and upright viewing mode, and second receptacle 1324 corresponds to the stowed state of the HMD device. In another example, first receptacle 1322 can correspond to the deployed state and upright viewing mode having a first viewing angle of the display device, and second receptacle 1324 can correspond to the deployed state and prone viewing mode having a second viewing angle of the display device that differs from the first viewing angle.

Referring to first cam 1301-1, as another example, a first receptacle 1326 is located a different angular position along circular track 1320 as second receptacle 1328. For example, first receptacle 1322 may be located at −8 degrees in a radial reference frame of circular track 1320, and second receptacle 1328 may be located at 190 degrees (or other suitable angle) measured in the clockwise direction in FIG. 13. In this example, first receptacle 1326 corresponds to the deployed state and prone viewing mode, and second receptacle 1328 corresponds to the stowed state of the HMD device. Receptacle 1326 is offset 8 degrees from receptacle 1322, in this example, to provide an 8 degree angular offset between the upright viewing mode and the prone viewing mode. It will be understood that other suitable angular offsets may be used, such as an angle in the range of 6-10 degrees, as another example. Also in this example, receptacles 1324 and 1328 are provided at the same angular position, as these receptacles each correspond to the stowed state.

The adjustment mechanisms disclosed herein enable adjustment of a positioning, in one or more degrees of freedom, of forward component 104, including display device 108 relative to display mount 174 and rearward component 106. Such adjustment may include translation and/or rotation of the forward component relative to the display mount and/or rearward component. It will be understood that the example adjustment mechanisms disclosed herein are provided for illustrative purposes as other suitable adjustment mechanisms may be used adjust the positioning of the forward component 104, including display device 108 relative to display mount 174 and rearward component 106. Other examples of adjustment mechanisms may enable adjustment by translation and/or rotation of the forward component relative to the display mount and/or rearward component by varying an effective length dimension of a linkage of hinge assembly 102 (e.g., within a four-bar linkage). Alternatively or additionally, other examples of adjustment mechanisms may enable adjustment by translation and/or rotation of the forward component relative to the display mount and/or rearward component by varying an angle of a linkage of hinge assembly 102 relative to another linkage (e.g., within a four-bar linkage).

Figure 14A:
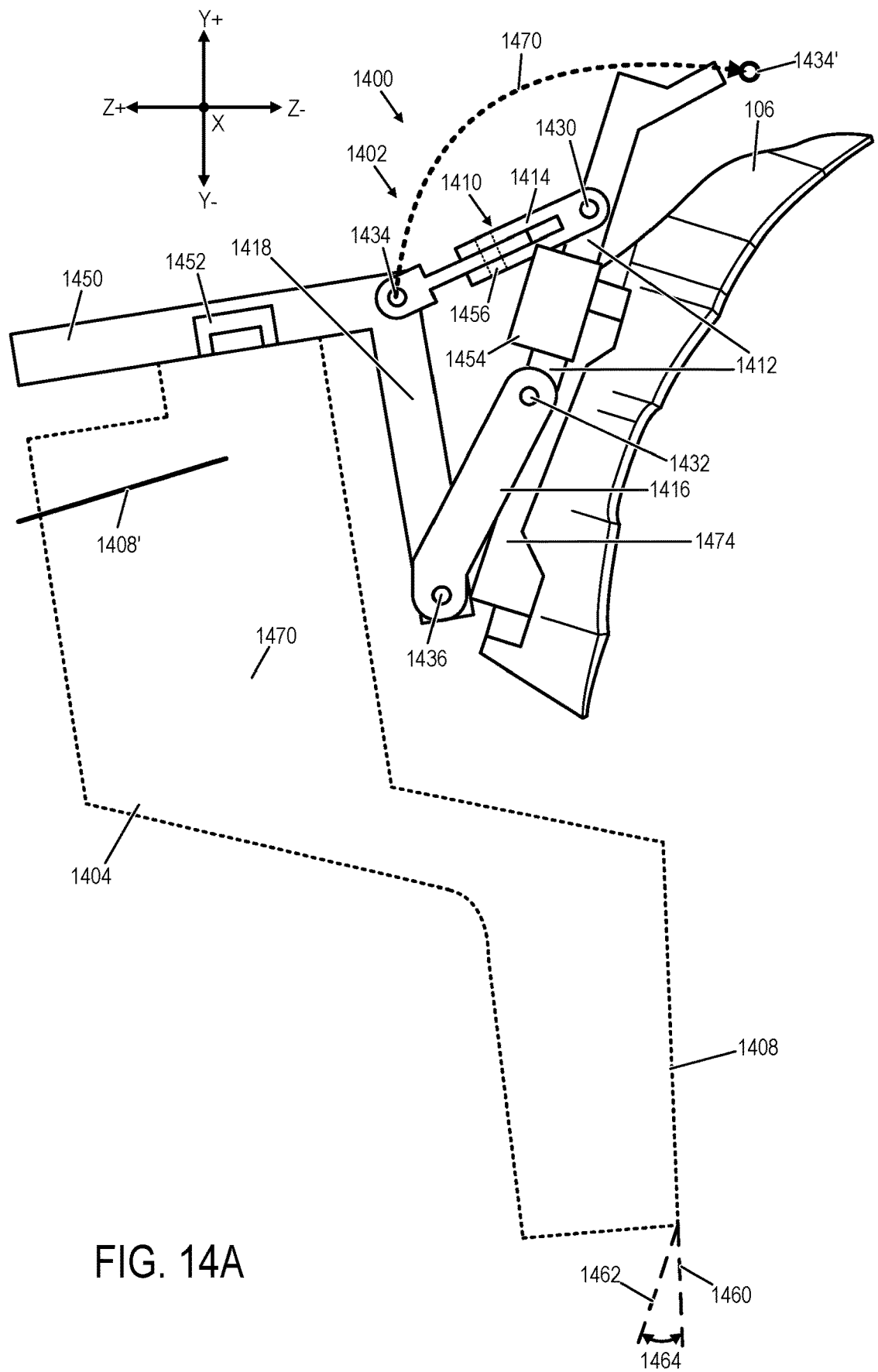
FIGS. 14A and 14B depict another example HMD device that includes a hinge assembly that rotatably couples a forward component of the HMD device to a rearward component of the HMD device.
Figure 14B:
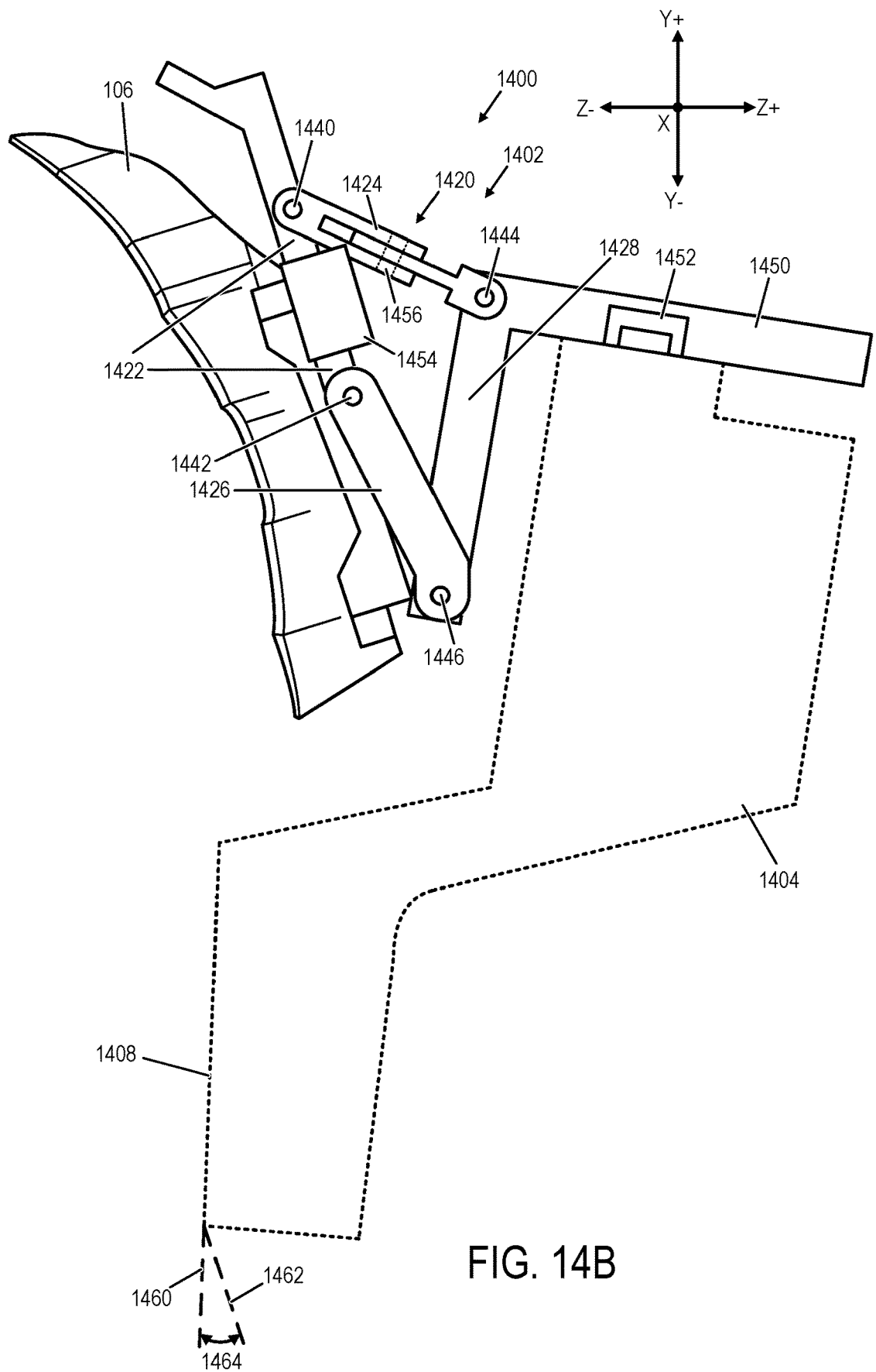

In the preceding examples of FIGS. 1-5, a hinge assembly featuring one or more four-bar linkages rotatably couples a forward component of an HMD device to a rearward component of the HMD device. In these examples, one or more adjustment mechanisms of the hinge assembly are operable to adjust a positioning of the forward component relative to the rearward component. FIGS. 14A and 14B depict another example HMD device 1400 that includes a hinge assembly 1402 that rotatably couples a forward component 1404 to rearward component 106 (previously described with reference to FIG. 1). FIG. 14A depicts HMD device 1400 from a first side in which the positive X-axis (X+) points out of the page. FIG. 14B depicts HMD device 1400 from a second side in which the positive X-axis (X+) points into the page.

As similarly described with reference to HMD 100 of FIG. 1, a forward component such as forward component 1404 can take the form of an electronic device that includes a display device 1408, such as a near-eye graphical display by which graphical content can be presented. Forward component 1404 may include additional components, including cameras, sensors, user input interfaces, audio output devices, batteries, computing devices, electronic circuitry, etc. Forward component 1404 is represented schematically in FIGS. 14A and 14B. Accordingly, it will be understood that forward component 1404 may take other suitable forms.

As previously described with reference to FIG. 1, rearward component 106 may be integrated with, mounted to, or mountable to a wearable article that can be worn upon a head of a user. Examples of wearable articles include a helmet, hat, visor, headband, or other head covering. Rearward component 106, as an example, may take the form of a shroud that can be mounted to a helmet, as depicted schematically in FIGS. 2, 4, and 5.

Hinge assembly 1402 includes one or more four-bar linkages that provides a path of travel for display device 1408 along a curved path between a deployed state and a stowed state. FIGS. 14A and 14B depict HMD device 1400 and hinge assembly 1402 in the deployed state.

Referring to FIG. 14A, hinge assembly 1402 includes a first four-bar linkage 1410. First four bar linkage 1410 includes a first linkage 1412, a second linkage 1414, a third linkage 1416, and a fourth linkage 1418. In this example, first linkage 1412 forms a ground linkage of first four-bar linkage 1410; second linkage 1414 and third linkage 1416 each form a rocker linkage of first four-bar linkage 1410; and fourth linkage 1418 forms a coupler linkage of first four-bar linkage 1410. First linkage 1412 is rotatably coupled to second linkage 1414 via a joint 1430, and first linkage 1412 is rotatably coupled to third linkage 1416 via a joint 1432 that is spaced apart from joint 1430 to define an effective length dimension of first linkage 1412. Fourth linkage 1418 is rotatably coupled to second linkage 1414 via a joint 1434 that is spaced apart from joint 1430 to define an effective length dimension of second linkage 1414, and fourth linkage 1418 is rotatably coupled to third linkage 1416 via a joint 1436 that is spaced apart from joint 1432 to define an effective length dimension of third linkage 1416. Joint 134 is spaced apart from joint 136 to define an effective length dimension of fourth linkage 1418.

As previously described with reference to FIGS. 2-4, a four-bar linkage of a linkage assembly can provide a path of travel of a display device along a curved path between the deployed state and the stowed state. FIG. 14A schematically depicts an example path of travel 1470 for joint 1434 from the deployed state to the stowed state at 1434', and an example orientation of display device 1408 in the deployed state at 1408'.

Referring to FIG. 14B, hinge assembly 1402 can further include a second four-bar linkage 1420 that operates in parallel with first four-bar linkage 1410. For example, second four-bar linkage 1420 can include a first linkage 1422 that forms a ground linkage of the second four-bar linkage; a second linkage 1424 and a third linkage 1426 that each form a rocker linkage of the second four-bar linkage; and a fourth linkage 1428 that forms a coupler linkage of the second four-bar linkage. In this example, first linkage 1422 is rotatably coupled to second linkage 1424 via a joint 1440, and the first linkage is rotatably coupled to third linkage 1426 via a joint 1442 that is spaced apart from joint 1440 to define an effective length dimension of the first linkage. Furthermore, in this example, fourth linkage 1428 is rotatably coupled to second linkage 1424 via a joint 1444 that is spaced apart from joint 1440 to define an effective length dimension of the second linkage, and the fourth linkage is rotatably coupled to third linkage 1426 via a joint 1446 that is spaced apart from joint 1444 to define an effective length dimension of the third linkage. The effective length dimension of fourth linkage 1428 is defined by a distance between 1444 joint and joint 1446, in this example.

As similarly described with reference to HMD 100 of FIG. 1, fourth linkage 1418 of first four-bar linkage 1410 and fourth linkage 1428 of second four-bar linkage 1420 of HMD device 1400 may be mounted to or integrated with a coupler bracket or forward component 1404, as examples. In this example, fourth linkage 1418 and fourth linkage 1428 are integrated together to form a coupler bracket 1450 to which forward component 1404 including display device 1408 is mounted.

As similarly described with reference to HMD 100 of FIG. 1, first linkage 1412 of first four-bar linkage 1410 and first linkage 1422 of second four-bar linkage 1420 may be mounted to or integrated with a shared component, such as a separate ground bracket, rearward mount, rearward component 106, or a wearable article, as examples. In this example, HMD 1400 includes rearward mount 1474 that is mounted or mountable to rearward component 106, as similarly described with reference to rearward mount 174 of FIG. 1.

Hinge assembly 1402 of HMD device 1400, in this example, includes at least three adjustment mechanisms, including an adjustment mechanism 1452 (represented schematically in FIGS. 14A and 14B) operable to adjust a positioning of forward component 1404 relative to fourth linkage 1418 of first linkage assembly 1410 and fourth linkage 1428 of second linkage assembly 1420 in at least the Z-axis dimension (e.g., toward or away from the eyes of the user and the wearable article to which the HMD is mounted) by translation; an adjustment mechanism 1454 (represented schematically in FIGS. 14A and 14B) operable to adjust a positioning of first four-bar linkage 1410 and second four-bar linkage 1420 relative to rearward component 1406 in at least the Y-axis dimension (e.g., up or down relative to the eyes of the user and the wearable article to which the HMD is mounted), and an adjustment mechanism 1456 (represented schematically in FIGS. 14A and 14B) operable to adjust a viewing angle of display device 1408 by varying an effective length of second linkage 1414 and second linkage 1424.

In contrast to the configurations of HMD 100 of FIG. 1 and HMD 100-5 of FIG. 5, hinge assembly 1402 of HMD 1400 enables adjustment in the Z-axis dimension via adjustment mechanism 1452 located forward of first four-bar linkage 1410 and second four-bar linkage 1420, and adjustment in the Y-axis dimension via adjustment mechanism 1454 located rearward of first four-bar linkage 1410 and second four-bar linkage 1420. An example of adjustment mechanism 1452 is described in further detail with reference to FIG. 15. An example of adjustment mechanism 1454 is described in further detail with reference to FIG. 16.

Additionally, adjustment mechanism 1456 of linkage assembly 1402 enables adjustment of a viewing angle of display device 1408 by varying an effective length of a rocker linkage of first four-bar linkage 1410 and second four-bar linkage 1420, which in this example corresponds to second linkages 1414 and 1424. As an example, the viewing angle of display device 1408 can be adjusted from a first viewing angle 1460 to a second viewing angle 1462, as represented schematically by viewing angle adjustment 1464, by reducing an effective length of second linkages 1414 and 1424. An example of adjustment mechanism 1456 is described in further detail with reference to FIG. 17. In other examples, an adjustment mechanism can be provided that enables adjustment of the viewing angle by varying an effective length of third linkage 1416 and 1426, which is another example of a rocker linkage of first four-bar linkage 1410 and second four-bar linkage 1420.

FIGS. 14A and 14B depict HMD device 1400 in the upright viewing mode of the deployed state, suitable for a seated or standing body position, in which display device 1408 has first viewing angle 1460 or range of viewing angles. In the prone viewing mode of the deployed state, suitable for a prone body position of the user in which the neck and head are tilted rearward relative to the body, display device 1408 has a second viewing angle 1462 or range of viewing angles. As an example, in the prone viewing mode corresponding to second viewing angle 1462, an upper edge of the display plane of the display device may be angled rearward relative to a lower edge of the display plane by an amount that is greater than the first viewing angle 1460 of the upright viewing mode. As one example, the viewing angle adjustment 1464 between first viewing angle 1460 and second viewing angle 1462 is 8 degrees. As another example, the viewing angle adjustment 1464 between first viewing angle 1460 and second viewing angle 1462 is within a range of 6-10 degrees. However, it will be understood that other suitable viewing angle adjustments may be used or otherwise supported by an adjustment mechanism, such as adjustment mechanism 1456, as an example.

Adjustment mechanisms 1452, 1454, and 1456 are depicted schematically in FIGS. 14A and 14B. It will be understood that adjustment mechanisms of hinge assembly 1402 can take various forms and utilize a variety of configurations, as described in further detail herein.

Figure 18:
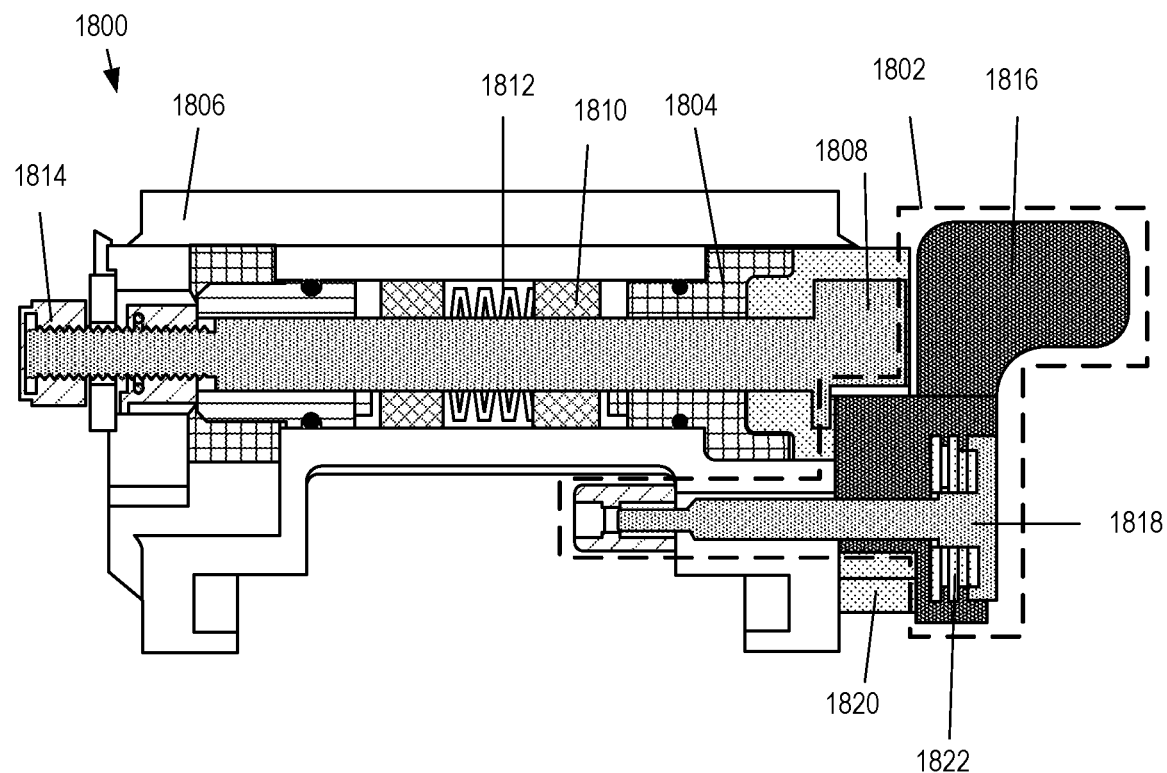
FIG. 18 depicts an example joint utilizing a tilt mechanism.
Figure 19:
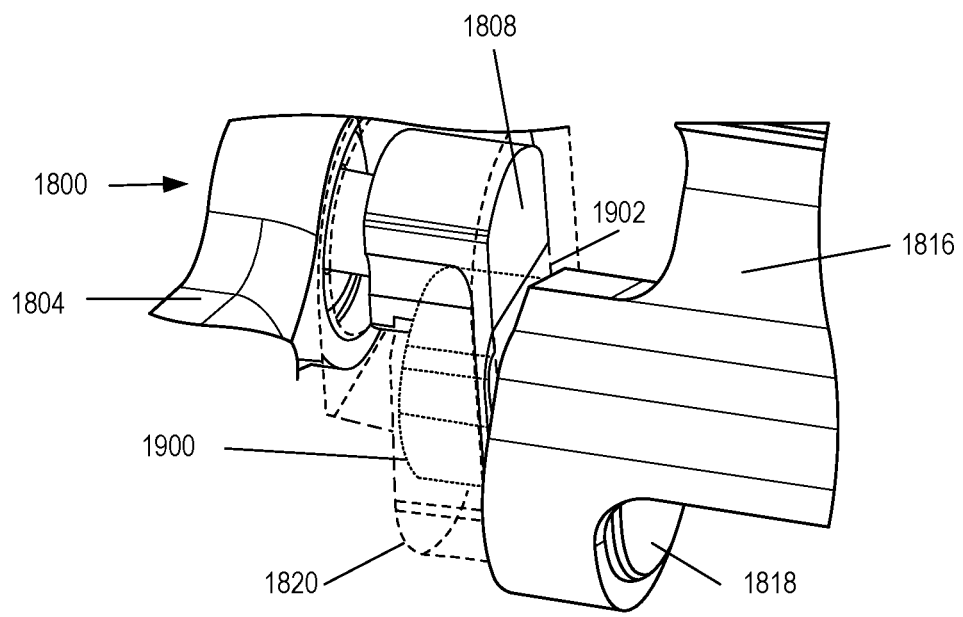
FIG. 19 depicts another view of the tilt mechanism of FIG. 18.

As previously described with reference to HMD device 100-5 of FIG. 5, one or more joints of a hinge assembly can feature an integrated adjustment device operable to adjust a viewing angle of the display device. In at least some examples, HMD device 1400 may include an adjustment device operable to adjust a viewing angle of display device 1408 located at or integrated with one or more joints of first four-bar linkage 1410 and/or second four-bar linkage 1420. Eccentric rotational bracket 600 previously described with reference to FIGS. 6-10 is an example of an adjustment device that can be integrated with one or more joints of hinge assembly 1402 to enable adjustment of the viewing angle. As another example of an adjustment mechanism, FIGS. 18 and 19 depict a tilting mechanism that can be located at or integrated with one or more joints of hinge assembly 1402 to enable adjustment of the viewing angle.

In at least some examples where one or more adjustment mechanisms for adjusting the viewing angle are located at or integrated with joints of hinge assembly 1402, adjustment mechanism 1456 may be omitted. However, in further examples, adjustment mechanisms located at or integrated with joints of the hinge assembly for adjusting the viewing angle may be used in addition to adjustment mechanism 1456 to provide greater flexibility for adjusting the viewing angle of the display device.

As previously described with reference to HMD device 100-5 of FIG. 5, one or more joints of a hinge assembly can feature an integrated detent mechanism and/or friction mechanism. In at least some examples, HMD device 1400 may include a detent mechanism and/or friction mechanism located at or integrated with one or more joints of hinge assembly 1402. As an example, friction mechanisms 1100 and/or 1200 previously described with reference to FIGS. 11 and 12 can be integrated with one or more joints of hinge assembly 1402. As another example, detent mechanism 1300 previously described with reference to FIG. 13 can be integrated with one or more joints of hinge assembly 1402.

Figure 15:
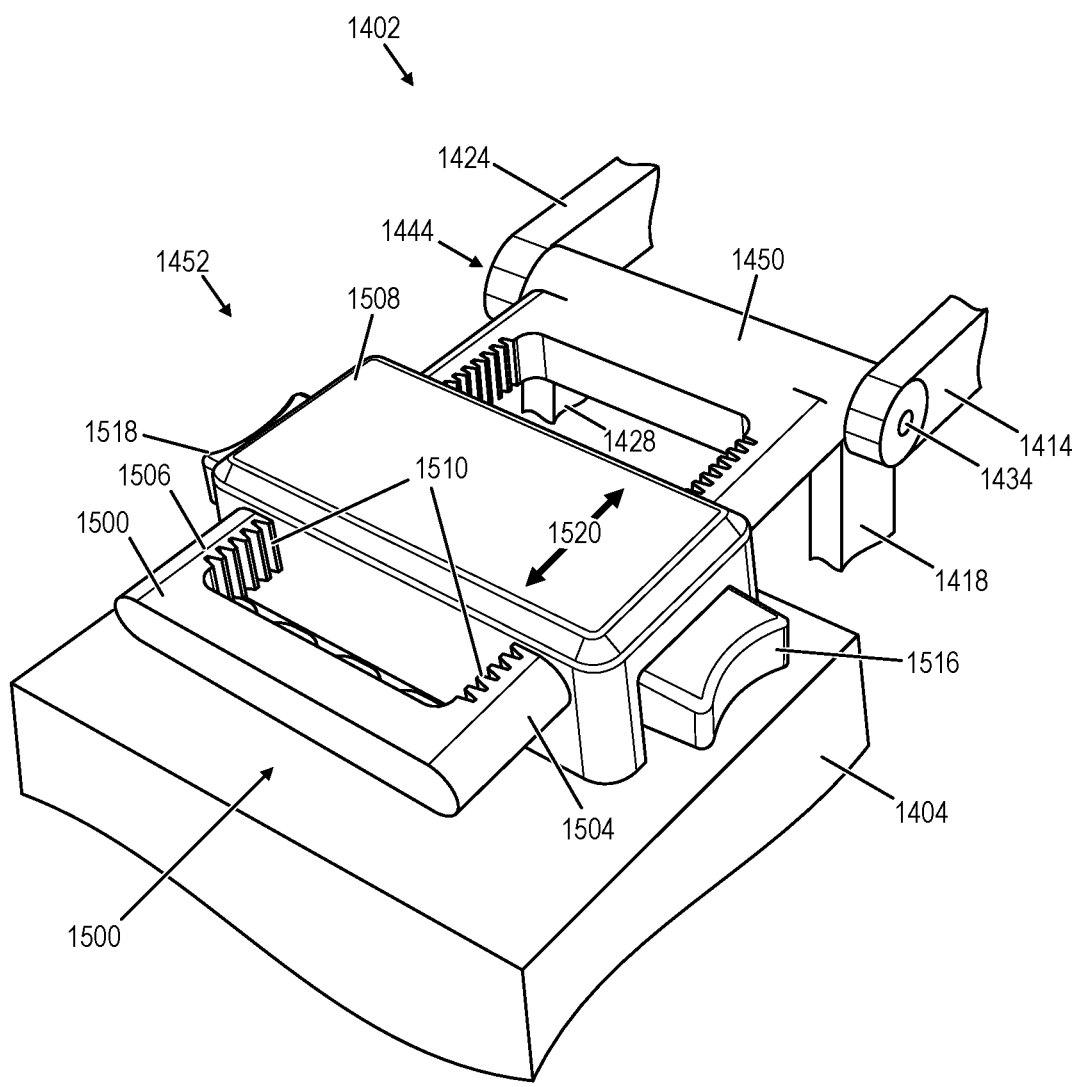
FIG. 15 depicts a portion of the hinge assembly of FIGS. 14A and 14B in further detail, including a first adjustment mechanism.

FIG. 15 depicts a portion of hinge assembly 1402 of FIGS. 14A and 14B in further detail, including an example of adjustment mechanism 1452. In this example, adjustment mechanism 1452 features a track system 1500 orientated along an axis that is parallel to or has a component in the Z-axis dimension, shown in FIGS. 14A and 14B. A first portion 1502 of track system 1500 forms a pair of rails 1504 and 1506 that constrains movement of a carriage 1508 of the track system along the axis of the track system, including in a direction having a component in the Z-axis dimension, as indicated by arrow 1520. Forward component 1404 is mounted to or integrated with carriage 1508, in this example. Furthermore, in this example, the first portion 1502 of track system 1500 including rails 1504 and 1506 forms part of coupler bracket 1450 mounted to or integrated with fourth linkage 1418 of first four-bar linkage and fourth linkage 1428 of second four-bar linkage 1420.

In this example, first portion 1502 includes a set of teeth 1510 disposed along rails 1504 and 1506. As depicted in FIG. 15, the teeth of rail 1504 oppose the teeth of rail 1506. Carriage 1508 houses a corresponding set of teeth that interface with the teeth of rail 1504 and the teeth of rail 1506. As an example, the teeth of carriage 1508 that interface with the teeth of rail 1504 and the teeth of carriage 1508 that interface with the teeth of rail 1506 can be spring-biased outward to maintain the position of carriage 1508 at a fixed position relative to first portion 1502, thereby maintaining the position of forward component 1404 relative to fourth linkage 1418 and fourth linkage 1428 of hinge assembly 1402.

Carriage 1508 further includes actuators 1516 and 1518 that are operable to oppose the force of the spring bias applied to the teeth of carriage 1508 by depressing the actuators inward toward each other to thereby move the teeth of carriage 1508 to a position not interfacing with the teeth of first portion 1502. When the teeth of carriage 1508 are not interfacing with the teeth of first portion 1502, the carriage is permitted to translate along first portion 1502 of track system 1500 as indicated by arrow 1520, thereby enabling the user to move forward component 1404 forward and rearward relative to the eyes of the user in the Z-axis dimension.

The particular configuration of adjustment mechanism 1452 described with reference to FIG. 15 is one example of an adjustment mechanism that is operable to adjust a positioning of forward component 1404 relative to hinge assembly 1402, and hence relative to rearward component 1406. It will be understood that adjustment mechanism 1452 can have other suitable configurations, including the configuration of adjustment mechanism 172 of FIG. 1, as an example.

Figure 16:
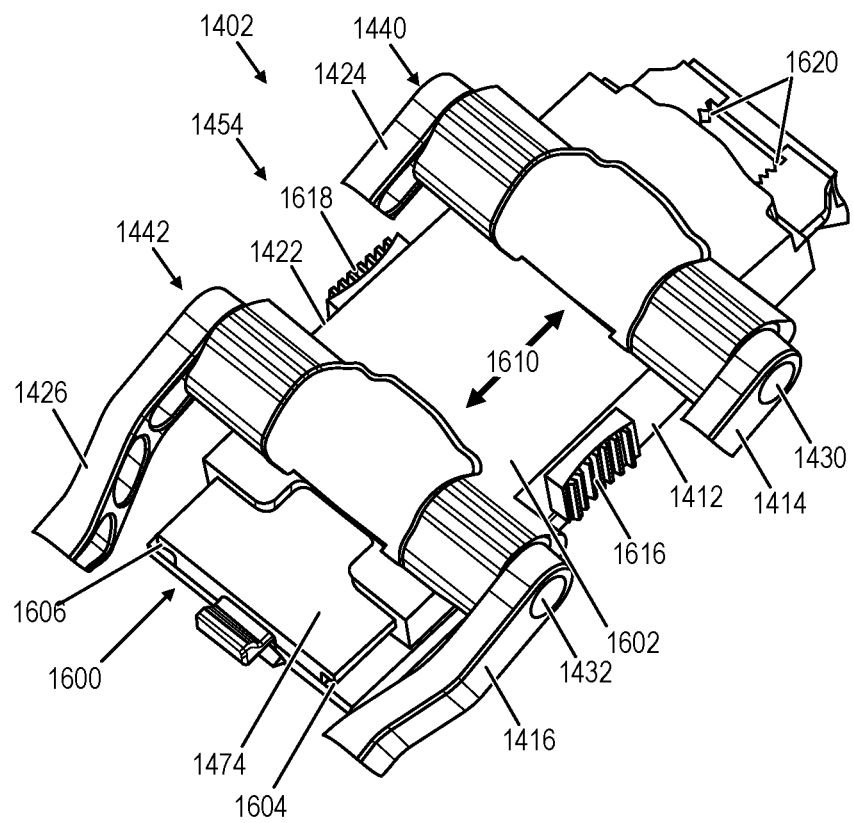
FIG. 16 depicts a portion of the hinge assembly of FIGS. 14A and 14B in further detail, including a second adjustment mechanism.

FIG. 16 depicts a portion of hinge assembly 1402 of FIGS. 14A and 14B in further detail, including an example of adjustment mechanism 1454. In this example, adjustment mechanism 1454 features a track system 1600 that is orientated along an axis that is parallel to or has a component in the Y-axis dimension, shown in FIGS. 14A and 14B. Track system 1600 includes a ground bracket 1602 that is moveable along rails 1604 and 1606 of rearward mount 1474 as indicated by arrow 1610.

In this example, first linkage 1412 of first linkage assembly 1410 and first linkage 1422 of second linkage assembly 1420 are integrated with ground bracket 1602. Rearward mount 1474 is mountable to rearward component 106, such as a shroud (as depicted in FIGS. 14A and 14B) or directly to a wearable article. Accordingly, movement of ground bracket 1602 along rails 1604 and 1606 of rearward mount 1474 enables a positioning of hinge assembly 1402 and hence forward component 1404 to be adjusted in at least the Y-axis dimension relative to the rearward mount and hence rearward component 1406.

Rearward mount 1474 includes a set of teeth 1620 disposed along rails 1604 and 1606. As depicted in FIG. 16, the teeth of rail 1604 oppose the teeth of rail 1606. Ground bracket 1602 houses a corresponding set of teeth that interface with the teeth of rail 1604 and the teeth of rail 1606. As an example, the teeth of ground bracket 1602 that interface with the teeth of rail 1604 and the teeth of ground bracket 1602 that interface with the teeth of rail 1606 can be spring-biased outward to maintain the position of ground bracket 1602 (and hence first linkage 1412 and first linkage 1422) at a fixed position relative to rearward mount 1474, thereby maintaining the position of forward component 1404 relative to rearward component 1406.

Ground bracket 1602 further includes actuators 1616 and 1618 that are operable to oppose the force of the spring bias applied to the teeth of the ground bracket by depressing the actuators inward toward each other to thereby move the teeth of the ground bracket to a position not interfacing with the teeth of rails 1604 and 1606. When the teeth of ground bracket 1602 are not interfacing with the teeth of rails 1604 and 1606, the ground bracket is permitted to translate along rearward mount 1474 of track system 1600 as indicated by arrow 1610, thereby enabling the user to move hinge assembly 1602 and forward component 1404 upward and downward relative to the eyes of the user in the Y-axis dimension.

The particular configuration of adjustment mechanism 1454 described with reference to FIG. 16 is one example of an adjustment mechanism that is operable to adjust a positioning of hinge assembly 1402 and forward component 1404 relative to rearward component 1406. It will be understood that adjustment mechanism 1452 can have other suitable configurations, including the configuration of adjustment mechanism 152 of FIG. 1, as an example.

Figure 17:
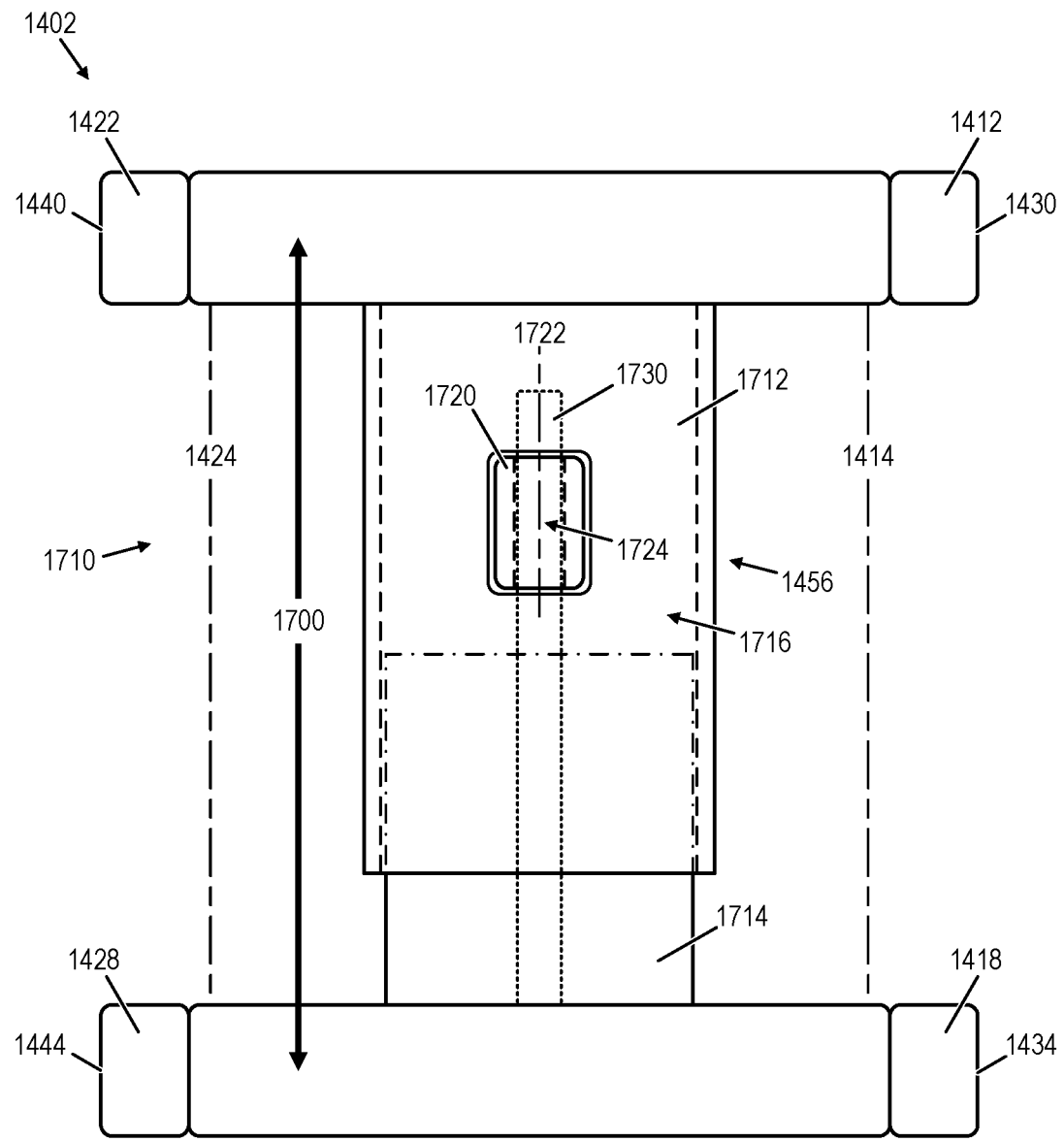
FIG. 17 depicts a portion of the hinge assembly of FIGS. 14A and 14B in further detail, including a third adjustment mechanism.

FIG. 17 depicts a portion of hinge assembly 1402 of FIGS. 14A and 14B in further detail, including an example of adjustment mechanism 1456. Adjustment mechanism 1456 is operable to adjust an effective length 1700 of second linkage 1414 of first four-bar linkage 1410 and second linkage 1424 of second-four-bar linkage 1420 depicted in FIGS. 14A and 14B.

In this example, second linkage 1414 of first four-bar linkage 1410 and second linkage 1424 of second-four-bar linkage 1420 are integrated into a shared linkage 1710 formed by a first portion 1712 and a second portion 1714. First portion 1712 takes the form of a first tube and second portion 1714 takes the form of a second tube having an exterior profile that can be accommodated by an interior bore 1716 of first portion 1712. Second portion 1714 can translate along interior bore 1716 of first portion 1712 to vary the effective length 1700.

Adjustment mechanism 1456 further includes a control element 1720 that is accessible to the user along an exterior of shared linkage 1710 to vary the effective length 1700. In this example, control element 1720 takes the form of a rotary wheel that is rotatable about an axis 1722 to vary the effective length 1700. As an example, control element 1720 can include a threaded interior bore 1724 that accommodates a threaded shaft 1730 that is mounted to and housed within second portion 1714.

By rotating control element 1720 about axis 1722, threaded shaft 1730 can be driven in either a first direction that increases the effective length 1700 or a second direction that decreases the effective length 1700, thereby varying the angle of fourth linkage 1418 of first four-bar linkage 1410 and fourth linkage 1424 of second-four-bar linkage 1420 relative to first linkage 1412 of first four-bar linkage 1410 and first linkage 1424 of second-four-bar linkage 1420. As forward component 1404 is mounted to or integrated with fourth linkage 1418 of first four-bar linkage 1410 and fourth linkage 1424 of second-four-bar linkage 1420, adjusting the effective length 1700 results in adjustment of the viewing angle for display device 1408 of the forward component.

The particular configuration of adjustment mechanism 1456 described with reference to FIG. 17 is one example of an adjustment mechanism that is operable to adjust the viewing angle. It will be understood that adjustment mechanism 1456 can have other suitable configurations. As an example, second portion 1714 can be maintained at a fixed position within bore 1716 of first portion 1712 by a post clamp that features a quick release lever (or other suitable clamping mechanism), enabling a user to selectively release clamping pressure via the lever enabling the second portion 1714 to translate within bore 1716 to a desired effective length 1700. As another example, shared linkage 1710 can include or take the form of a turnbuckle that enables a user to achieve a desired effective length 1700. As another example, a threaded shaft that is accommodated by a threaded opening through a side wall of first portion 1712 can be operated to apply a retaining force on an exterior wall of second portion 1714 to maintain second portion 1714 at a fixed position within bore 1716 of first portion 1712, and loosened (e.g., using a knob of the threaded shaft or suitable tool) to enable second portion 1714 to translate within bore 1716 to achieve a desired effective length. As yet another example, a threaded collar can be used to apply a suitable clamping pressure that retains second portion 1714 at a fixed position relative to first portion 1712. As yet another example, first portion 1712 and second portion 1714 can form a track system that utilizes the configurations of adjustment mechanisms 1452 of FIG. 15, 1454 of FIG. 16, or 172 of FIG. 1. In still further examples, other suitable gearing configurations can be used that are operable to enable second portion 1714 to translate within bore 1716 while maintaining a desired effective length 1700 following adjustment.

FIG. 18 schematically depicts an example joint 1800 featuring a tilt mechanism 1802 as an example of an adjustment mechanism that is operable to vary a viewing angle of a display device. Tilt mechanism 1802 can be used with any of the HMD devices disclosed herein. Joint 1800 is an example implementation of any of the joints disclosed herein as part of a hinge assembly.

In this example, joint 1800 rotatably couples a linkage 1804 to another linkage 1806. Joint 1800 comprises a main shaft 1808 that allows movement between the deployed position and the stowed position. Joint 1800 further comprises a cam 1810 keyed to main shaft 1808. Cam 1810 comprises a hard-stop configured to restrict angular movement of joint 1800 when the hard-stop engages with a corresponding feature on linkage 1804, such as in the deployed position, for example. In some examples, the hard-stop can comprise hills and valleys that interact with the corresponding feature of linkage 1804. Joint 1800 further comprises a spring 1812 that provides a compressive force to engage cam 1810 with linkage 1804. As shown, joint 1800 further comprises a nut 1814 operable to adjust torque on cam 1810.

Tilt mechanism 1802 is configured to allow the second angular adjustment of joint 1800 between a first viewing angle and a second viewing angle in the deployed state. Specifically, tilt mechanism 1802 adjusts an angular position of the hard-stop of cam 1810 relative to a rotational axis of joint 1800. Tilt mechanism 1802 comprises a control mechanism in the form of a control lever 1816. Control lever 1816 is configured to rotate around a secondary shaft 1818. As control lever 1816 rotates around secondary shaft 1818, a linkage 1820 transfers rotational movement to main shaft 1808. When main shaft 1808 rotates, cam 1810 also rotates relative to a rotational axis of main shaft 1808. In such a manner, a location of the hills and valleys of cam 1810 can be adjusted by angular movement relative to a rotational axis of joint 1800. This changes the location where linkage 1804 is held for the deployed position, thus allowing movement between the first and second viewing angles. Tilt mechanism 1802 further comprises a frictional torque in the form of friction washers 1822. Friction washers 1822 are configured to provide resistance to the rotational movement of control lever 1816 relative to secondary shaft 1818. Such a configuration can help to reduce an accidental movement of joint 1800. In the depicted example, a portion of friction washers 1822 are connected to secondary shaft 1818 and a remainder of friction washers 1822 are connected to control lever 1816. FIG. 18 is illustrative. In other examples, pivot 1800 may comprise additional components not illustrated and/or omit components depicted.

FIG. 19 depicts another view of tilt mechanism 1802. Tilt mechanism 1802 comprises an eccentric pin 1900 connected to control lever 1816. As control lever 1816 rotates, eccentric pin 1900 moves within a slot 2102 of linkage 1820, thereby rotating linkage 1820. Further, linkage 1820 is configured to engage with main shaft 1808 such that the rotation of linkage 1820 is transferred to main shaft 1808. In such a manner, tilt mechanism 1802 allows movement of joint 1800 in a manner that provides different viewing angles in the deployed state while using a smaller area than separate pivots to move between the stowed position, the deployed position, and different viewing angles in the deployed state.

The hinge assemblies disclosed herein comprise various moving components. Mechanical clearances between the various moving components may result in undesired free movement of a hinge assembly, generally referred to as backlash movement. Accordingly, any suitable interface between the various moving components of the hinge assembly can comprise one or more adjustment features. As an example, an adjustment feature can comprise an interference fit, such as scallop cuts, for example, to help tighten up the mechanical clearances. The scallop cuts can help to reduce pressure between components that move, and thus frictional force. Yet as another example, an adjustment mechanism that features a track system can comprise one or more gibs to generate tight tolerances and reduce backlash movement. Specifically, the gib can comprise one or more tapered components that interface with each other to reduce a distance between two components of the hinge assembly. In some examples, the gib is adjustable, such as with adjustment screws, for example. The gib can be adjusted as a factory setting and/or in the field. As a further example, an adjustment mechanism that comprises interlocking features can further comprise an anti-backlash nut to reduce backlash movement. In other examples, any other suitable adjustment feature that tightens up mechanical clearances may be used with any moving component disclosed herein. It will be understood that the example adjustment features disclosed herein are provided for illustrative purposes as other suitable adjustment features may be used to tighten up mechanical clearances and reduce backlash movement.

According to an example of the present disclosure, a hinge assembly for a head-mounted display device comprises: a four-bar linkage; wherein a first linkage of the four-bar linkage is mountable to or forms part of a wearable article for a head of a user; wherein a second linkage and a third linkage of the four-bar linkage each rotatably couple the first linkage to a fourth linkage of the four-bar linkage; wherein the fourth linkage of the four-bar linkage is mountable to or forms part of a display device. In this example or other examples disclosed herein, the hinge assembly can further comprise an adjustment mechanism operable to adjust a positioning of the fourth linkage relative to the first linkage between a first viewing mode at which the fourth linkage has a first angle relative to the first linkage, and a second viewing mode at which the fourth linkage has a second angle relative to the first linkage that differs from the first angle. In this example or other examples disclosed herein, the hinge assembly can further comprise a forward mount by which the display device is mountable to the fourth linkage; and an adjustment mechanism operable to adjust a positioning of the forward mount relative to the fourth linkage. In this example or other examples disclosed herein, the hinge assembly can further comprise a rearward mount by which the first linkage is mountable to the wearable article; and an adjustment mechanism operable to adjust a positioning of the rearward mount relative to the first linkage. In this example or other examples disclosed herein, hinge assembly can further comprise: a rearward mount by which the first linkage is mountable to the wearable article; a first adjustment mechanism operable to adjust a positioning of the rearward mount relative to the first linkage in at least a first dimension; a forward mount by which the display device is mountable to the fourth linkage; and a second adjustment mechanism operable to adjust a positioning of the forward mount relative to the fourth linkage in at least a second dimension that is orthogonal to the first dimension. In this example or other examples disclosed herein, the hinge assembly can further comprise a third adjustment mechanism operable to adjust a positioning of the fourth linkage relative to the first linkage between a first viewing mode at which the fourth linkage has a first angle relative to the first linkage, and a second viewing mode at which the fourth linkage has a second angle relative to the first linkage that differs from the first angle. In this example or other examples disclosed herein, the hinge assembly can further comprise a detent mechanism integrated with a joint that rotatably couples a bar to another bar of the four-bar linkage. In this example or other examples disclosed herein, the detent mechanism, while engaged, maintains the fourth linkage at a first position relative to the first linkage that corresponds to a deployed state or at a second position relative to the first linkage that corresponds to a stowed state. In this example or other examples disclosed herein, the detent mechanism, while engaged, maintains the fourth linkage at a first angle relative to the first linkage that corresponds to a first viewing angle of the display device or at a second angle relative to the first linkage that corresponds to a second viewing angle of the display device that differs from the first viewing angle. In this example or other examples disclosed herein, the hinge assembly can further comprise a friction mechanism integrated with a joint that rotatably couples a bar to another bar of the four-bar linkage.

According to another example of the present disclosure, a head-mounted display device comprises: a display device; a rearward mount by which the head-mounted display device is mountable to a wearable article for a head of a user; and a hinge assembly rotatably coupling the display device to the rearward mount; wherein the hinge assembly includes a four-bar linkage that provides a path of travel for the display device along a curved path between a deployed state and a stowed state. In this example or other examples disclosed herein, the head-mounted display device can further comprise an adjustment mechanism by which a positioning of the display device relative to the rearward mount is adjustable in the deployed state. In this example or other examples disclosed herein, the head-mounted display device can further comprise an adjustment mechanism operable to adjust an angle of the display device relative to the rearward mount between a first viewing mode at which the display device has a first angle relative to the rearward mount, and a second viewing mode at which the display device bar has a second angle relative to the rearward mount that differs from the first angle. In this example or other examples disclosed herein, the head-mounted display device can further comprise a detent mechanism at a joint of the hinge assembly by which a bar of the four-bar linkage is rotatably coupled to another bar of the four-bar linkage; wherein the detent mechanism, while engaged, maintains the deployed state or the stowed state. In this example or other examples disclosed herein, head-mounted display device can further comprise a detent mechanism at a joint of the hinge assembly by which a bar of the four-bar linkage is rotatably coupled to another bar of the four-bar linkage; wherein the detent mechanism, while engaged, maintains the display device at a first angle relative to the rearward mount that corresponds to a first viewing angle of the display device or at a second angle relative to the rearward mount that corresponds to a second viewing angle of the display device that differs from the first viewing angle. In this example or other examples disclosed herein, the head-mounted display device can further comprise a friction mechanism at a joint of the hinge assembly by which a bar of the four-bar linkage is rotatably coupled to another bar of the four-bar linkage.

According to another example of the present disclosure, a head-mounted display device comprises: a wearable article for a head of a user; a display device; and a hinge assembly rotatably coupling the display device to the wearable article; wherein the hinge assembly includes a four-bar linkage that provides a path of travel for the display device along a curved path between a deployed state and a stowed state; and wherein the display device in the stowed state is rearward of the deployed state and above the wearable article. In this example or other examples disclosed herein, the wearable article comprises a helmet; and wherein the hinge assembly is mounted to the helmet via a rearward mount that forms a first portion of a latch, and a shroud mounted to the helmet that forms a second portion of the latch; and wherein the rearward mount is selectively unmounted from the shroud via release of the latch. In this example or other examples disclosed herein, a display vector of the display device is directed toward an upper portion of the helmet in the stowed state. In this example or other examples disclosed herein, the head-mounted display device can further comprise an adjustment mechanism by which a positioning of the display device relative to the wearable article is adjustable in the deployed state.

It will be understood that the configurations and/or approaches described herein are exemplary in nature, and that these specific embodiments or examples are not to be considered in a limiting sense, because numerous variations are possible.

The subject matter of the present disclosure includes all novel and non-obvious combinations and sub-combinations of the various systems and configurations, and other features, functions, acts, and/or properties disclosed herein, as well as any and all equivalents thereof.

The invention claimed is:

1. A hinge assembly for a head-mounted display device, the hinge assembly comprising:
    a four-bar linkage comprising a first linkage, a second linkage, a third linkage, and a fourth linkage;
    wherein the first linkage is rotatably coupled to the second linkage and the third linkage, and is mountable to or forms part of a wearable article for a head of a user;
    wherein the second linkage and the third linkage are each rotatably coupled to the first linkage and to the fourth linkage;
    wherein the fourth linkage is rotatably coupled to the second linkage and the third linkage, and is mountable to or forms part of a display device.

2. The hinge assembly of claim 1, further comprising:
    an adjustment mechanism operable to adjust a positioning of the fourth linkage relative to the first linkage between a first viewing mode at which the fourth linkage has a first angle relative to the first linkage, and a second viewing mode at which the fourth linkage has a second angle relative to the first linkage that differs from the first angle.

3. The hinge assembly of claim 1, further comprising:
    a forward mount by which the display device is mountable to the fourth linkage; and
    an adjustment mechanism operable to adjust a positioning of the forward mount relative to the fourth linkage.

4. The hinge assembly of claim 1, further comprising:
    a rearward mount by which the first linkage is mountable to the wearable article; and
    an adjustment mechanism operable to adjust a positioning of the rearward mount relative to the first linkage.

5. The hinge assembly of claim 1, further comprising:
    a rearward mount by which the first linkage is mountable to the wearable article;
    a first adjustment mechanism operable to adjust a positioning of the rearward mount relative to the first linkage in at least a first dimension;
    a forward mount by which the display device is mountable to the fourth linkage; and
    a second adjustment mechanism operable to adjust a positioning of the forward mount relative to the fourth linkage in at least a second dimension that is orthogonal to the first dimension.

6. The hinge assembly of claim 5, further comprising:
    a third adjustment mechanism operable to adjust a positioning of the fourth linkage relative to the first linkage between a first viewing mode at which the fourth linkage has a first angle relative to the first linkage, and a second viewing mode at which the fourth linkage has a second angle relative to the first linkage that differs from the first angle.

7. The hinge assembly of claim 1, further comprising:
    a detent mechanism integrated with a joint that rotatably couples a bar to another bar of the four-bar linkage.

8. The hinge assembly of claim 7, wherein the detent mechanism, while engaged, maintains the fourth linkage at a first position relative to the first linkage that corresponds to a deployed state or at a second position relative to the first linkage that corresponds to a stowed state.

9. The hinge assembly of claim 7, wherein the detent mechanism, while engaged, maintains the fourth linkage at a first angle relative to the first linkage that corresponds to a first viewing angle of the display device or at a second angle relative to the first linkage that corresponds to a second viewing angle of the display device that differs from the first viewing angle.

10. The hinge assembly of claim 1, further comprising:
a friction mechanism integrated with a joint that rotatably couples a bar to another bar of the four-bar linkage.

11. A head-mounted display device, comprising:
a display device;
a rearward mount by which the head-mounted display device is mountable to a wearable article for a head of a user; and
a hinge assembly rotatably coupling the display device to the rearward mount;
wherein the hinge assembly includes a four-bar linkage that provides a path of travel for the display device along a curved path between a deployed state and a stowed state, and wherein
the four-bar linkage comprises a first linkage, a second linkage, a third linkage, and a fourth linkage,
wherein the first linkage is rotatably coupled to the second linkage and the third linkage,
wherein the second linkage and the third linkage are each rotatably coupled to the first linkage and to the fourth linkage, and
wherein the fourth linkage is rotatably coupled to the second linkage and the third linkage.

12. The head-mounted display device of claim 11, further comprising:
an adjustment mechanism by which a positioning of the display device relative to the rearward mount is adjustable in the deployed state.

13. The head-mounted display device of claim 11, further comprising:
an adjustment mechanism operable to adjust an angle of the display device relative to the rearward mount between a first viewing mode at which the display device has a first angle relative to the rearward mount, and a second viewing mode at which the display device bar has a second angle relative to the rearward mount that differs from the first angle.

14. The head-mounted display device of claim 11, further comprising:
a detent mechanism at a joint of the hinge assembly by which a bar of the four-bar linkage is rotatably coupled to another bar of the four-bar linkage;
wherein the detent mechanism, while engaged, maintains the deployed state or the stowed state.

15. The head-mounted display device of claim 11, further comprising:
a detent mechanism at a joint of the hinge assembly by which a bar of the four-bar linkage is rotatably coupled to another bar of the four-bar linkage;
wherein the detent mechanism, while engaged, maintains the display device at a first angle relative to the rearward mount that corresponds to a first viewing angle of the display device or at a second angle relative to the rearward mount that corresponds to a second viewing angle of the display device that differs from the first viewing angle.

16. The head-mounted display device of claim 11, further comprising:
a friction mechanism at a joint of the hinge assembly by which a bar of the four-bar linkage is rotatably coupled to another bar of the four-bar linkage.

17. A head-mounted display device, comprising:
a wearable article for a head of a user;
a display device; and
a hinge assembly rotatably coupling the display device to the wearable article;
wherein the hinge assembly includes a four-bar linkage that provides a path of travel for the display device along a curved path between a deployed state and a stowed state; wherein
the four-bar linkage comprises a first linkage, a second linkage, a third linkage, and a fourth linkage,
wherein the first linkage is rotatably coupled to the second linkage and the third linkage,
wherein the second linkage and the third linkage are each rotatably coupled to the first linkage and to the fourth linkage, and
wherein the fourth linkage is rotatably coupled to the second linkage and the third linkage; and
wherein the display device in the stowed state is rearward of the deployed state and above the wearable article.

18. The head-mounted display device of claim 17, wherein the wearable article is a helmet; and
wherein the hinge assembly is mounted to the helmet via a rearward mount that forms a first portion of a latch, and a shroud mounted to the helmet that forms a second portion of the latch; and
wherein the rearward mount is selectively unmounted from the shroud via release of the latch.

19. The head-mounted display device of claim 17, wherein a display vector of the display device is directed toward an upper portion of the helmet in the stowed state.

20. The head-mounted display device of claim 17, further comprising:
an adjustment mechanism by which a positioning of the display device relative to the wearable article is adjustable in the deployed state.

* * * * *